United States Patent
Noda et al.

[11] Patent Number: 5,948,289
[45] Date of Patent: Sep. 7, 1999

[54] LASER BEAM MACHINING METHOD

[75] Inventors: Kyoji Noda, Arao; Shunichi Uchinami, Yamaga, both of Japan

[73] Assignee: Matsushita Electric Industrial Co., Ltd., Osaka, Japan

[21] Appl. No.: 08/755,164

[22] Filed: Nov. 25, 1996

[30] Foreign Application Priority Data

Nov. 29, 1995 [JP] Japan ..................................... 7-310503
May 22, 1996 [JP] Japan ..................................... 8-126760

[51] Int. Cl.⁶ .................................................. B23K 26/06
[52] U.S. Cl. .............................. 219/121.69; 219/121.73; 264/400
[58] Field of Search ........................ 219/121.61, 121.68, 219/121.69, 121.73; 264/400

[56] References Cited

U.S. PATENT DOCUMENTS

| | | | |
|---|---|---|---|
| 4,684,436 | 8/1987 | Burns et al. ................... | 219/121.69 X |
| 4,842,782 | 6/1989 | Portney et al. ................ | 264/1.38 |
| 5,319,183 | 6/1994 | Hosoya et al. ................. | 219/121.68 |
| 5,378,137 | 1/1995 | Asakawa et al. . | |
| 5,571,429 | 11/1996 | Smith et al. ................... | 219/121.68 |

FOREIGN PATENT DOCUMENTS

| | | |
|---|---|---|
| 4213106 | 11/1992 | Germany . |
| 7-9180 | 1/1995 | Japan . |
| 7164175 | 6/1995 | Japan . |

*Primary Examiner*—Gregory Mills
*Attorney, Agent, or Firm*—Stevens, Davis, Miller & Mosher, L.L.P.

[57] ABSTRACT

A laser beam machining method includes emitting light from a light source to illuminate a mask which has both openings through which light can pass to the object to be machined and blocking parts through which substantially no light can pass. By utilizing the energy of the light, those portions of the object which are exposed through the openings are machined by ablation. The shape and width of both the openings and the blocking parts can be adjusted so as to provide the energy distribution required to form an object of the desired shape and size.

9 Claims, 21 Drawing Sheets

LASER BEAM MACHINING METHOD

BACKGROUND OF THE INVENTION

1. Field of the Invention

The present invention relates to a laser beam machining method of very precisely machining a high-precision component such as a hologram or an ink-jet print head nozzle used in an ink-jet printer.

2. Description of the Related Art

By way of example, a conventional laser beam machining technique used to produce an ink-jet print head nozzle will be described below, although the technique also has various other applications in production of high-precision components. In recent years, as personal computers have come to be more and more widely used, ink-jet printers have also come to be widely used as a hard copy machine. Ink-jet print heads for use in ink-jet printers can generally be classified into three types. They are a resistance heating type in which ink is heated by means of resistance heating, an electric current heating type in which an electric current is passed directly through ink, and a piezoelectric type in which a voltage is applied to a piezoelectric element thereby inducing deformation in the piezoelectric element. These techniques will be described in further detail below.

In the resistance heating technique, heat is generated by passing a current through a resistance heater so that ink present in a region in direct contact with the heater is boiled by the generated heat thereby emitting ink through a nozzle and thus forming marks on paper or the like. In the technique in which a current is passed directly through ink, ink is boiled by the current flowing through the ink so that the ink is emitted through a nozzle thereby forming marks on paper or the like. In the print head based on the piezoelectric effect, mechanical vibrations are generated by applying a voltage to piezoelectric ceramic thereby emitting ink through a nozzle.

In any technique, it is required that a nozzle used in a print head have an optimized structure to achieve high performance in the operation of emitting ink and thus high quality in the printed characters or images.

The structure of the nozzle will be described in further detail below. In general, the nozzle includes: an orifice part having an opening through which ink is emitted; a channel through which ink passes; and an ink supplying part. Since the nozzle structure is an important factor in the ink emission performance, a great number of techniques in terms of the nozzle structure and production methods thereof have been developed and disclosed in patents. For example, Japanese Unexamined Patent Publication No. 7-164175 discloses a technique of forming a nozzle in a heat-resistant resin sheet using an excimer laser beam (excimer laser beam technique). Another technique is to produce a nozzle by means of nickel plating. This technique is known as the electroplating technique, and the nozzle produced by this technique are called electroplated nozzle. Although other techniques such as the technique of forming a nozzle using a stamper, the technique based on the injection molding, etc., are also known, the excimer laser beam technique and the electroplating technique are now widely used in practical production.

In the conventional technique of producing a nozzle using an excimer laser beam, separate various masks are prepared for an orifice part, an ink channel, and an ink supply part, and the orifice, the ink channel, and the ink supply part are produced in different processing steps using the corresponding masks. Thus, it is required to exchange the mask placed on an excimer laser machining system for each processing step.

As disclosed in the excimer laser beam machining technique disclosed in Japanese Unexamined Patent Publication No. 7-164175, it is known to use a mask covered with a reflecting film (semitransparent film) which changes in reflectance (transmittance) across the mask in accordance with the nozzle structure to be formed.

SUMMARY OF THE INVENTION

It is an object of the present invention to provide a laser beam machining method for easily and quickly producing a high-precision component, especially an ink-jet nozzle having high enough performance in terms of ink emission to achieve high quality in printed characters or images.

To achieve the above object, the present invention provides a laser beam machining method including the steps of: emitting a light ray from a light source so that the light ray illuminates a mask having an opening portion through which the light ray can pass and a blocking portion through which the light ray cannot pass; and illuminating an object to be machined with the light passing through the opening portion of the mask thereby supplying working light to the object, whereby the object is machined by the energy of the working light.

DESCRIPTION OF THE PREFERRED EMBODIMENTS

Embodiment 1

Figure 22:
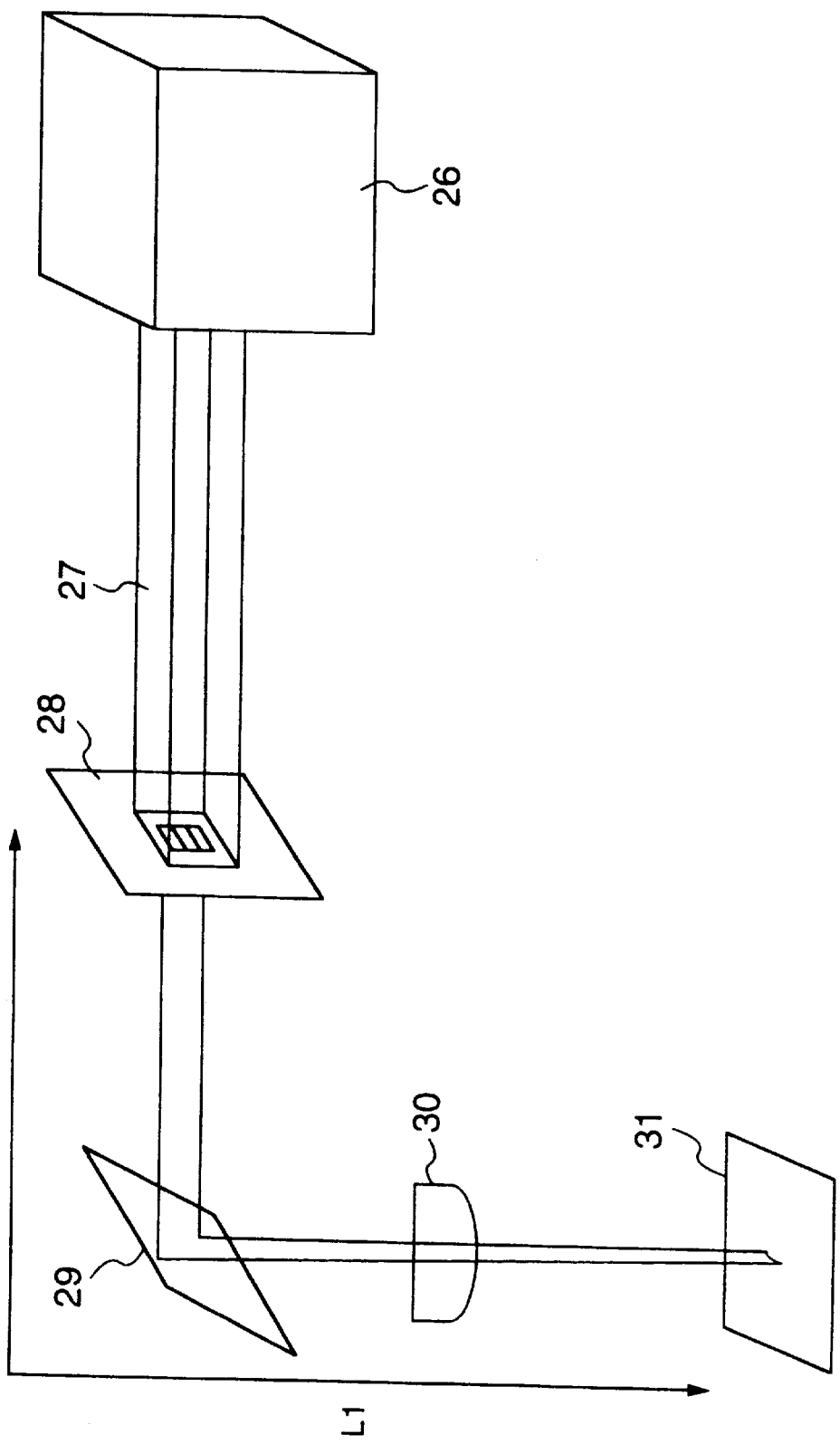
FIG. 22 is a schematic diagram illustrating a laser beam machining method according to an embodiment of the invention.

FIG. 22 is a schematic diagram illustrating a laser beam machining technique according to a first embodiment of the present invention.

As shown in FIG. 22, the laser beam machining system includes a light source 26. It is desirable that the light source 26 can emit a high-energy light beam having good rectilinearity to achieve high machining efficiency and high machining accuracy. To meet the above requirements, a preferable example of the light source 26 is a laser light source. In this particular embodiment, an excimer laser (for emitting light with a wavelength of about 248 nm) is employed to perform high-precision machining by means of ablation. Instead of the laser, a synchrotron radiation source may also be employed to emit a high-energy light beam with high rectilinearity. In this case, the machining accuracy may be further improved and the machining may be performed for a shorter working time.

The light beam 27 emitted by the light source 26 travels through a mask 28, a mirror 29, and a focusing optical system 30, and finally reaches an object 31 to be machined. The focusing optical system 30 is an optical lens system for focusing the light beam 27 into a reduced image wherein the reduction ratio is generally within the range from ⅓ to ¼. The mask 28 will be described in further detail below.

Figure 23:
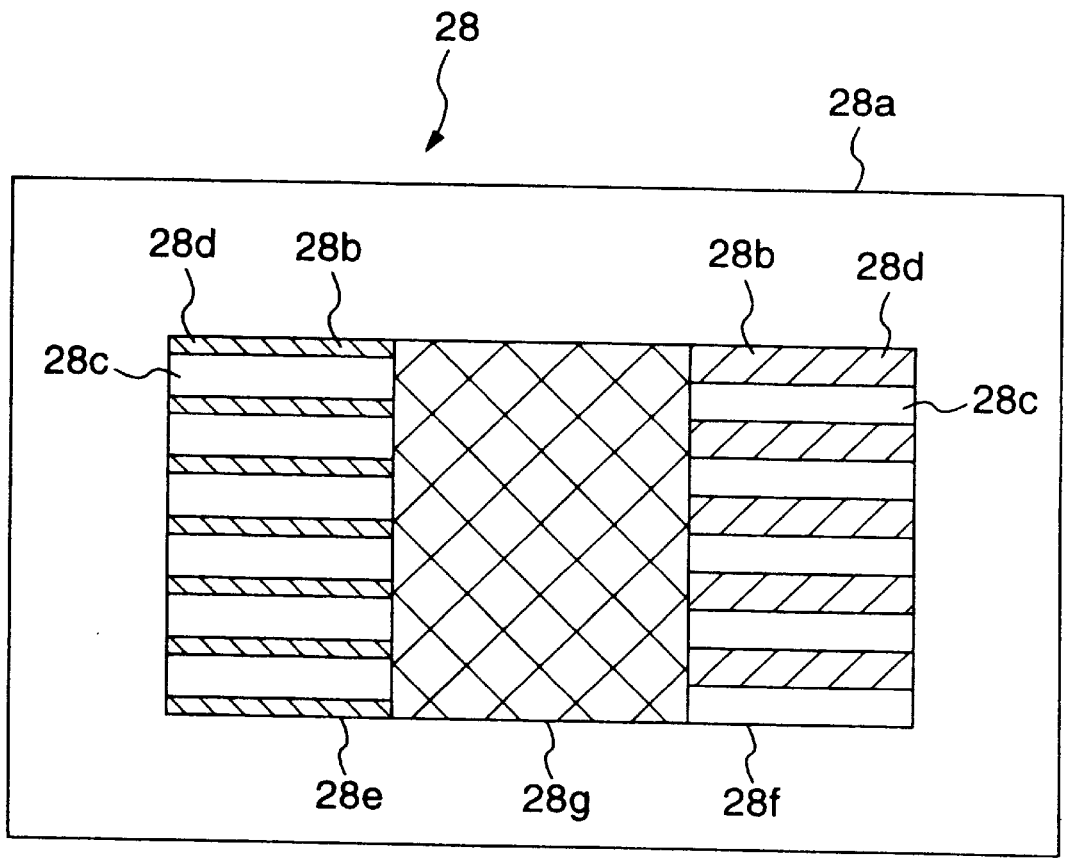
FIG. 23 is a top view of a mask according to an embodiment of the invention.
Figure 24:
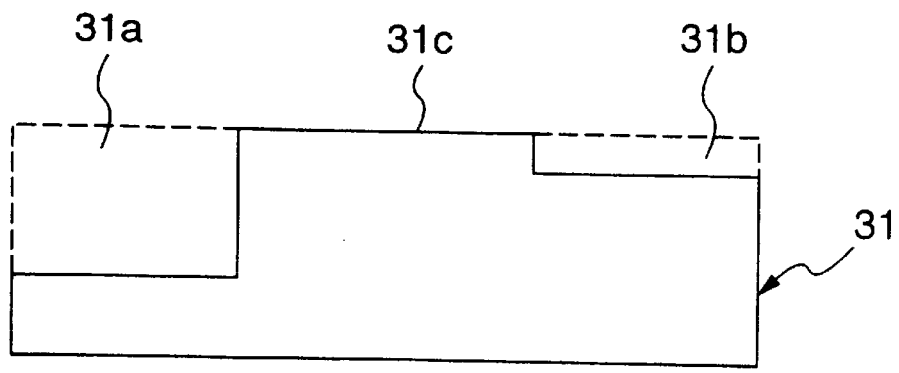
FIG. 24 is a cross-sectional view of an object to be machined according to an embodiment of the invention.

FIG. 23 is a top view of the mask according to the present embodiment of the invention. FIG. 24 is a cross-sectional view of an object which has been machined according to the method of the present embodiment of the invention. As shown in FIG. 23, the mask 28 is composed of a substrate 28a and a slit pattern 28b formed on the substrate 28a. In the substrate 28a, the surface on which the slit pattern 28b is formed is preferably parallel to the opposite surface so that no shift occurs in the optical axis when the light beam passes through the mask 28. Furthermore, the substrate 28a is preferably made up of a material which is highly transparent to the laser beam to minimize the loss of the energy of the laser beam. Of various materials, quartz glass is particularly preferable since it can transmit nearly 100% of laser beam with substantially no energy loss. More particularly, synthetic quartz glass is more preferable since it is inexpensive and thus it leads to a reduction in production cost.

The slit pattern 28b is formed in such a manner that the individual slits can pass desired amounts of light depending on the locations of the slits. The slits of the slit pattern 28b formed on the substrate 28a preferably have widths determined in accordance with the structure to be formed in the object 31 to be machined. That is, the slit widths and the ratios of the areas of the respective openings 28c (white areas) to the areas of the blocking portions 28d (black areas) of the slit pattern 28b are selected so that the light beam arriving at the object 31 to be machined after passing through the respective openings has energy optimum to create a desired structure in the object 31 to be machined.

In the specific example shown in FIG. 23, the slit pattern 28b of the mask 28 includes: a low density pattern area 28e having a low ratio of the blocking parts 28d to the opening 28c; a high density pattern area 28f having a high ratio of the blocking parts 28d to the openings 28c; and a pattern area 28g having only a blocking part and having no openings. With the laser beam 27 passing through the mask 28 having such the slit pattern 28b, the object 31 is machined into a structure in cross section such as that shown in FIG. 24 wherein the structure has a machined area 31a corresponding to the low density pattern area 28e, a machined area 31b corresponding to the high density pattern area 28f, and a machined area 31c corresponding to the pattern area 28g.

The slit pattern 28b is preferably formed using a thin metal film with high durability to the laser beam, containing at least one metal selected from the group consisting of Cr, Ag, Ti, Pt, and Ni. Another example of a preferable material for the slit pattern 28b is a dielectric film having a multilayer structure composed of dielectric layers with a high refractive index and dielectric layers with a low refractive index, which are alternately deposited one on another. The above materials are especially suitable because use of these materials leads to the minimized reduction in the thickness of the slit pattern layer 28b caused by the illumination of the laser beam. In the case where metal is employed as the material, Cr is most preferable to achieve high accuracy in the slit pattern 28b, which results in high accuracy in the resultant structure in the object 31. On the other hand, when a dielectric film is employed, nearly 100% of the laser beam incident on the blocking parts of the slit pattern layer is reflected, and thus substantially no reduction occurs in the film thickness due to the illumination of the laser beam. Of various kinds of dielectric films, a combination of $TiO_2$ and $SiO_2$ layers is preferable in that film stress in the respective layers occurs in directions opposite to each other and thus the stress is cancelled. This ensures that substantially no deformation occurs in the dielectric film regardless of the change in environmental conditions such as temperature.

The thickness of the blocking parts 28d of the slit pattern 28d is preferably in the range from 800 Å to 2500 Å. If the thickness is smaller than 800 Å, the life time of the mask 28 will be very short due to a great change in characteristics with time such as a reduction in the film thickness caused by the illumination of a laser beam. On the other hand, if the film thickness is greater than 2500 Å, the side walls of the openings reflect a greater amount of light, and the scattered light leads to degradation in the machining accuracy. If the film thickness is controlled within the range from 800 Å to 2500 Å, the mask 28 has a long life and exhibits low scattering of light. This makes it possible to achieve high machining accuracy without having to exchange the mask 28 frequently. The film thickness in the range from 1200 Å to 2000 Å is more preferable to achieve a better result in terms of the above features.

In the case where a metal material is employed, the slit pattern 28b may be produced by depositing a metal film on the substrate 28a to a desired thickness by means of evaporation or sputtering, and then forming a pattern of openings 28c in the deposited metal film by means of an electron beam. With this technique, it is possible to form openings with extremely high precision in the slit pattern layer 28b. Thus, it becomes possible to form a desired structure in the object 31 to be machined using the mask 28.

If the mask 28 having the above-described structure is employed, it is possible to arbitrarily change the amount of light passing through the mask 28 after being emitted by the light source 26, depending on the position across the mask 28. As a result, it is possible to form an arbitrary desired structure in the object by illuminating it only once with a laser beam through the single mask.

Compared to the conventional technique in which the amount of light passing through a mask is controlled by adjusting the thickness of a reflective film (semitransparent film) formed on a substrate, the technique of the present invention has the advantage that it is possible to easily control the amount of light simply by adjusting the width of slits without having to adjust the thickness of the slit pattern layer. This makes it easy to produce a mask. Furthermore, unlike the conventional technique, even if the thickness of the mask 28 is reduced by the illumination of the laser beam 7, substantially no change occurs in the structure formed in the object to be machined 31 as long as the slit pattern layer 28b maintains the ability of reflecting nearly 100% of light or unless the transparency of the mask 28 drops down to a level (for example 60% or lower) which can no longer transmit the laser light with a sufficiently high energy to form the desired structure in the object 31. This allows the mask 28 to be used for a longer time.

In the present embodiment, as described above, the openings and blocking parts of the mask 28 are formed into the shape of slits. This is because slits can be easily formed in the mask and an arbitrary desired energy distribution across the object to be machined can be easily achieved using the mask.

The openings and blocking parts of the mask 28 may also be formed into the shape of a mosaic.

The principle of the laser beam machining technique according to the present embodiment of the invention will be described below. The laser beam emitted by the light source 26 encounters diffraction when it passes through the openings 28c of the slit pattern layer. The laser beam also encounters some scattering before reaching the object 31 to be machined. Furthermore, interference can occur among these light components. As a result, the energy density distribution of the light obtained when the light arrives at the object 31 to be machined is different from that the light has immediately after emerging from the openings 28c of the slit pattern layer. The diffraction, scattering, and interference can be controlled by properly changing the widths of the openings 28c and the blocking parts 28d of the slit pattern 28b. In other words, it is possible to select the widths of the openings 28c and the blocking parts 28d of the slit pattern 28b so that the energy density distribution of the light obtained immediately after emerging from the openings is such that which allows the light to have a desirable energy density distribution corresponding to the structure to be formed when the light arrives at the object 31 to be machined. In the operation of producing the structure in the object 31, it is desirable that the distance L1 between the mask 28 and the object 31 to be machined be in the range 0.3 (m)≦L1≦2.0 (m). If L1 is shorter than 0.3 m, the focusing optical system 30 disposed at a location where the light arrives after emerging from the mask 28 is required to focus the light beam onto the object 31 located at a focal point with an extremely short focal length so that an image having the desired energy density distribution is formed on the object 31 to be machined. However, such the focusing optical system 30 has usually great aberration which causes the image formed on the object 31 to become vague. As a result, the image formed on the object 31 no longer has the intended energy density distribution, and thus it becomes difficult to obtain the intended structure in the object 31 to be machined.

On the other hand, if L1 is longer than 2.0 m, it becomes difficult to control the diffraction and the interference by adjusting the widths of the openings 28c and the blocking parts 28d of the slit pattern layer 28b. As a result, it becomes difficult to obtain a desired energy density distribution on the object 31 to be machined. This results in a large error in the structure formed in the object 31.

If the distance L1 is within the range 0.3 (m)≦L1≦2.0 (m), it is possible to form a high-precision structure in the object 31 without encountering such the problems described above. The range 0.8 (m)≦L1≦1.5 (m) is more preferable to achieve higher precision in the resulting structure.

Embodiment 2

As will be described below with reference to the drawings, the laser beam machining technique described above can be employed to produce an ink-jet print head nozzle.

Figure 1:
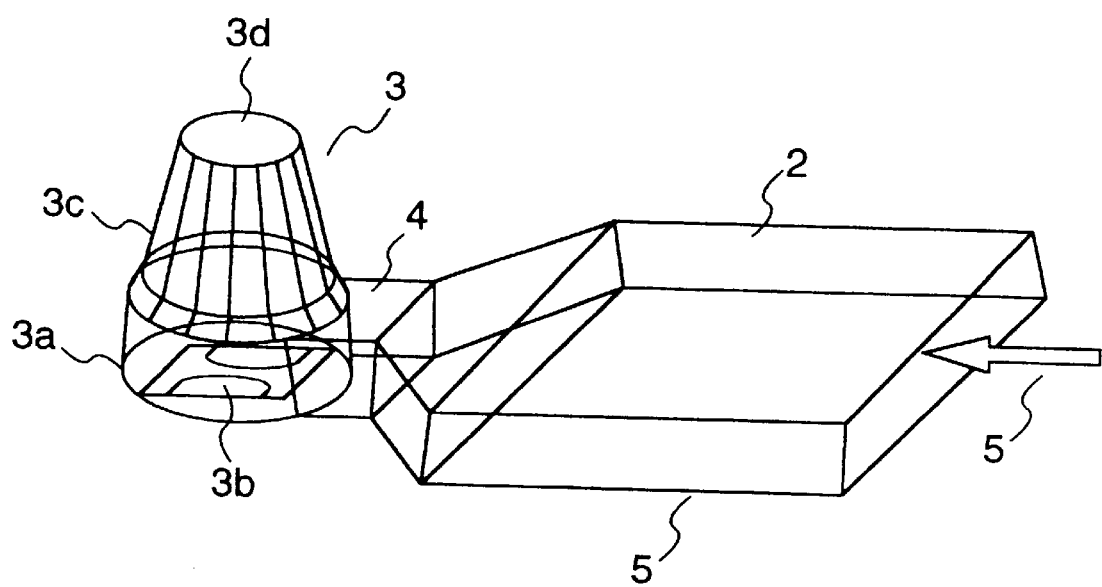
FIG. 1 is a fragmentary perspective view illustrating a part of an ink-jet head including a nozzle according to an embodiment of the present invention.
Figure 2:
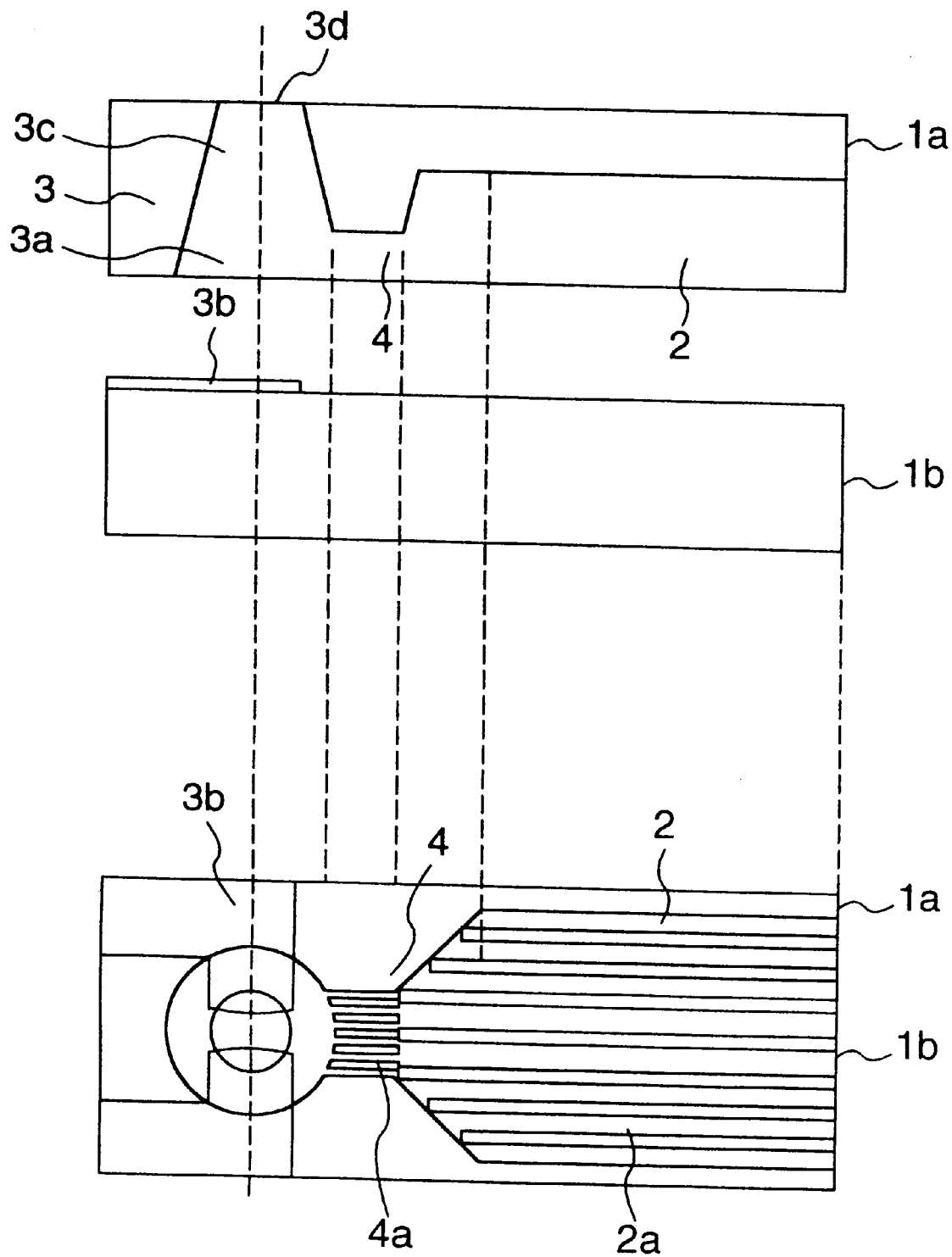
FIG. 2 is a cross-sectional view illustrating the ink-jet head including a nozzle according to the embodiment of the present invention.

FIG. 1 is a fragmentary perspective view illustrating a part of an ink-jet head including a nozzle according to an embodiment of the present invention. FIG. 2 is a cross-sectional view of the ink-jet head including a nozzle according to the embodiment of the invention. In FIGS. 1 and 2, the ink-jet print head nozzle (hereinafter referred to simply as a nozzle 1) includes: an ink supplying part 2 composed of an upper nozzle substrate 1a and a lower nozzle substrate 1b adhered to each other; an orifice part 3 having an opening through which ink is emitted; and an ink channel 4 for connecting the ink supplying part 2 to the orifice part 3. The ink supplying part 2 serves as a path through which ink is supplied from an ink tank (not shown) into the ink channel. The ink supplying part 2 is preferably shaped such that its cross section in the region near the ink channel 4 decreases along the ink supply direction denoted by an arrow 5 so that the flow of the ink obtains an increased pressure and a proper velocity when it passes there. Furthermore, fine grooves 2a and 4a are preferably formed on the inner walls, which are in direct contact with ink, of the ink supply part 2 and the ink channel 4 in such a manner that the grooves 2a and 4a extend along the ink supply direction thereby ensuring that the ink can stably flow at a predetermined constant velocity without encountering serious disturbance such as pulsation or turbulence and thus high printing quality can be achieved.

After passing through the ink supplying part 2 and the ink channel 4, the ink enters a pressure chamber 3a of the orifice part 3. The pressure chamber 3a serves as an ink reservoir by which the pressure of the incoming ink is adjusted to a proper value. The pressure chamber 3a has an electrode 3b formed on its bottom which is a part of the substrate, wherein the electrode 3b is used to pass a current through the ink so as to boil it. The orifice part 3 also has an orifice 3c including an ink emission opening 3d through which ink is emitted toward a printing medium (not shown). Preferably, the cross section, parallel to the electrode 3b, of the orifice 3c gradually decreases toward the ink emission opening 3d thereby ensuring that the ink is correctly directed toward the emission opening 3d and a correct amount of ink is emitted. When the ink arrives in the pressure chamber 3a, a predetermined amount of current is passed from the electrode 3b into the ink so that the ink is boiled by the energy of the current thereby generating a bubble in the pressure chamber 3a. By the bubble expanding in volume in the pressure chamber 3a, the ink is pushed outward through the orifice 3c. Because the cross section of the orifice 3c gradually decreases, the ink gains a large velocity with good rectilinearity as it passes through the orifice 3c, and the ink is finally emitted through the ink emission opening 3d toward a printing medium thereby recording information thereon.

The laser beam machining technique of forming the above structure will be described below with reference to the figures.

Figure 3:
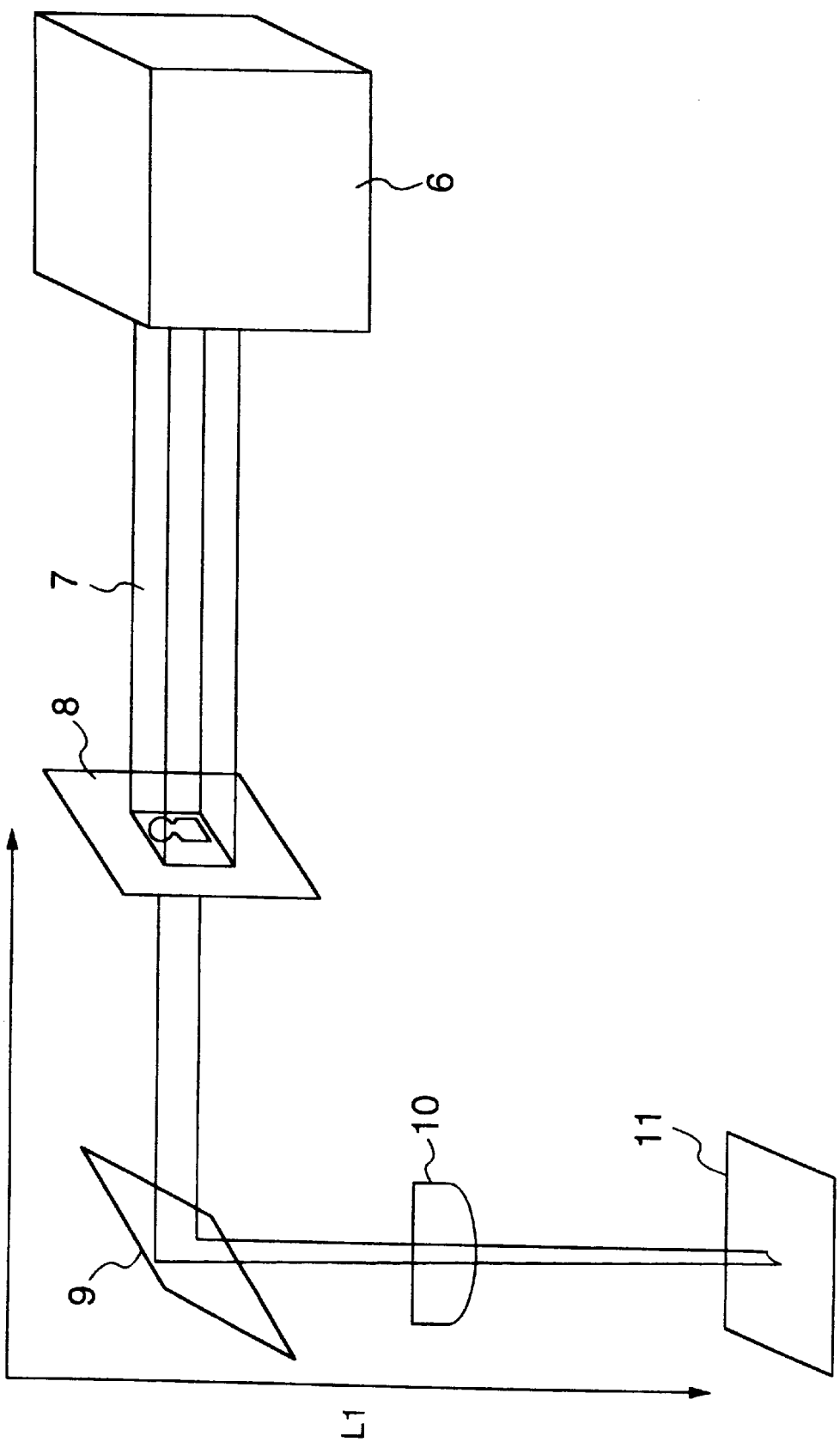
FIG. 3 is a schematic diagram illustrating a laser beam machining technique according to the embodiment of the invention.

FIG. 3 is a schematic diagram illustrating the laser beam machining technique according to the present embodiment of the invention.

In FIG. 3, the laser beam machining system includes a light source 6. It is desirable that the light source 6 can emit a high-energy light beam having good rectilinearity to achieve high machining efficiency and high machining accuracy. To meet the above requirements, a laser light source may preferably be employed as the light source 26. In this particular embodiment, an excimer laser is employed as the light source 26.

The light beam 7 emitted by the light source 6 travels through a mask 8, a mirror 9, and a focusing optical system 10, and finally reaches a substrate sheet 11. The focusing optical system 10 is an optical lens system for focusing the light beam 7 into a reduced image wherein the reduction ratio is generally within the range from ⅓ to ¼. The mask 8 and the substrate sheet 11 will be described in further detail below.

Figure 4A:
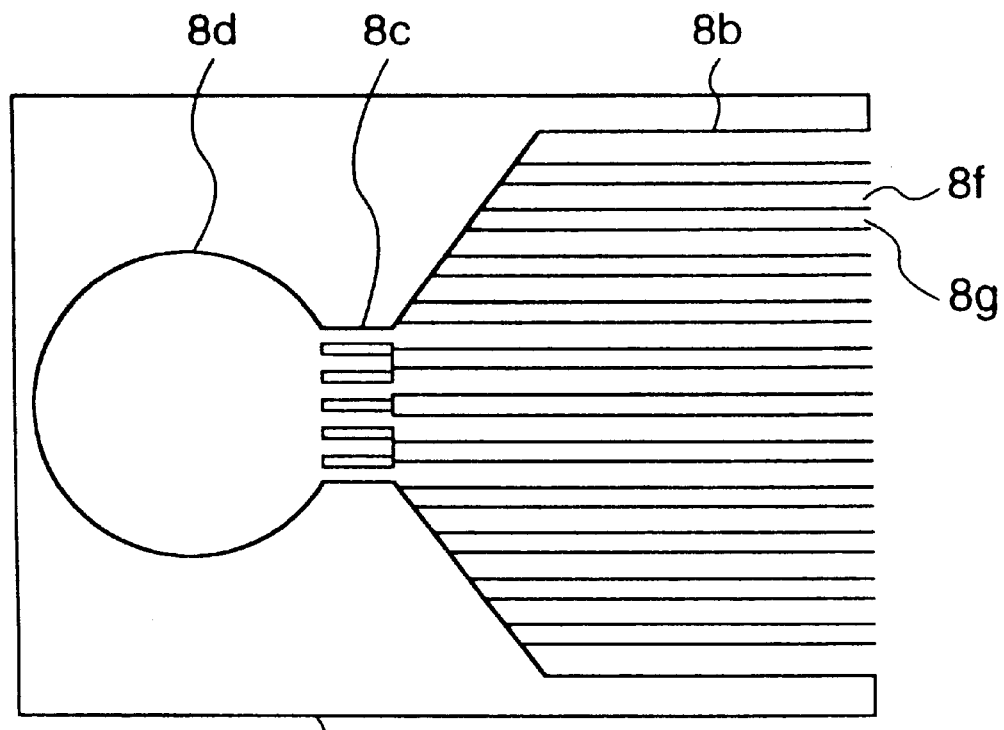
FIG. 4 is a schematic diagram illustrating a mask according to an embodiment of the present invention.
Figure 4B:
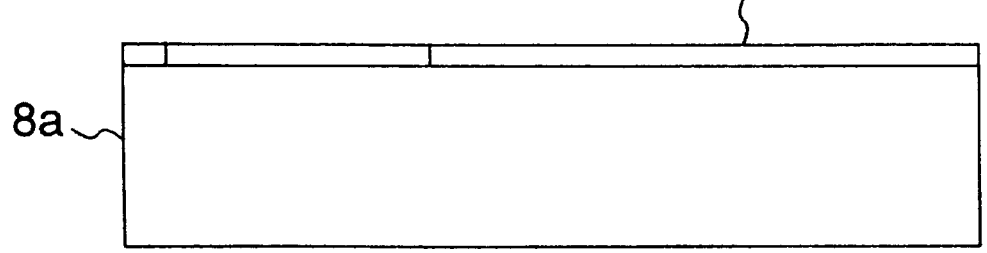
Figure 5A:
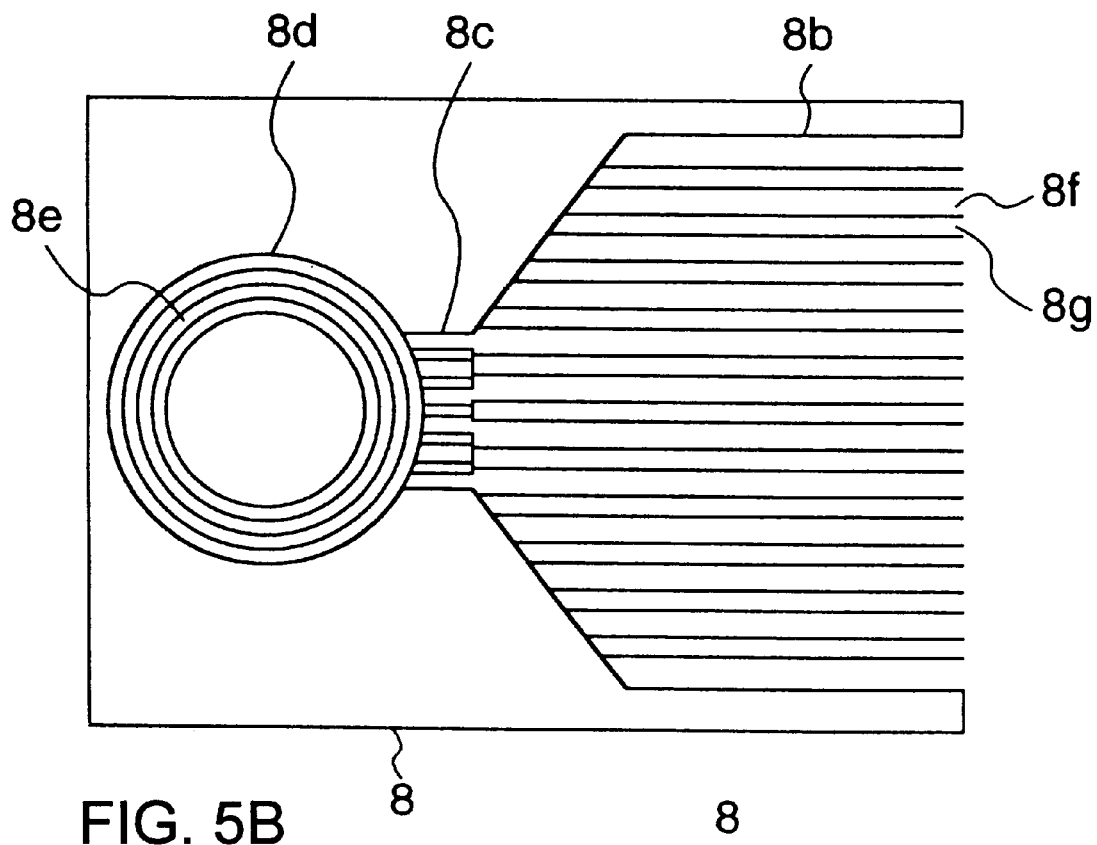
FIG. 5 is a schematic diagram illustrating a mask according to another embodiment of the present invention.
Figure 5B:
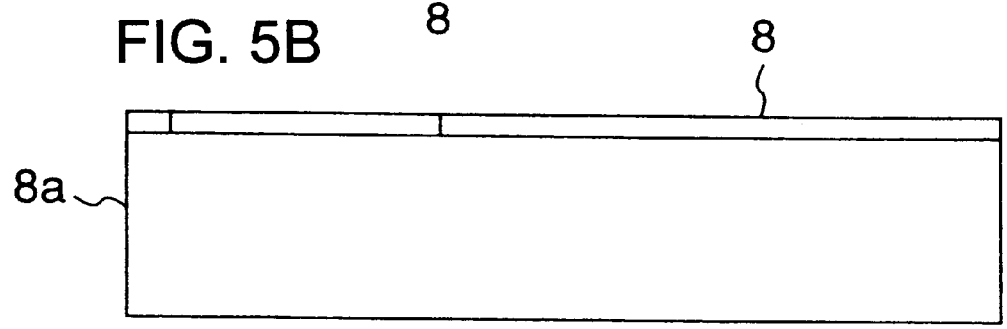
Figure 6:
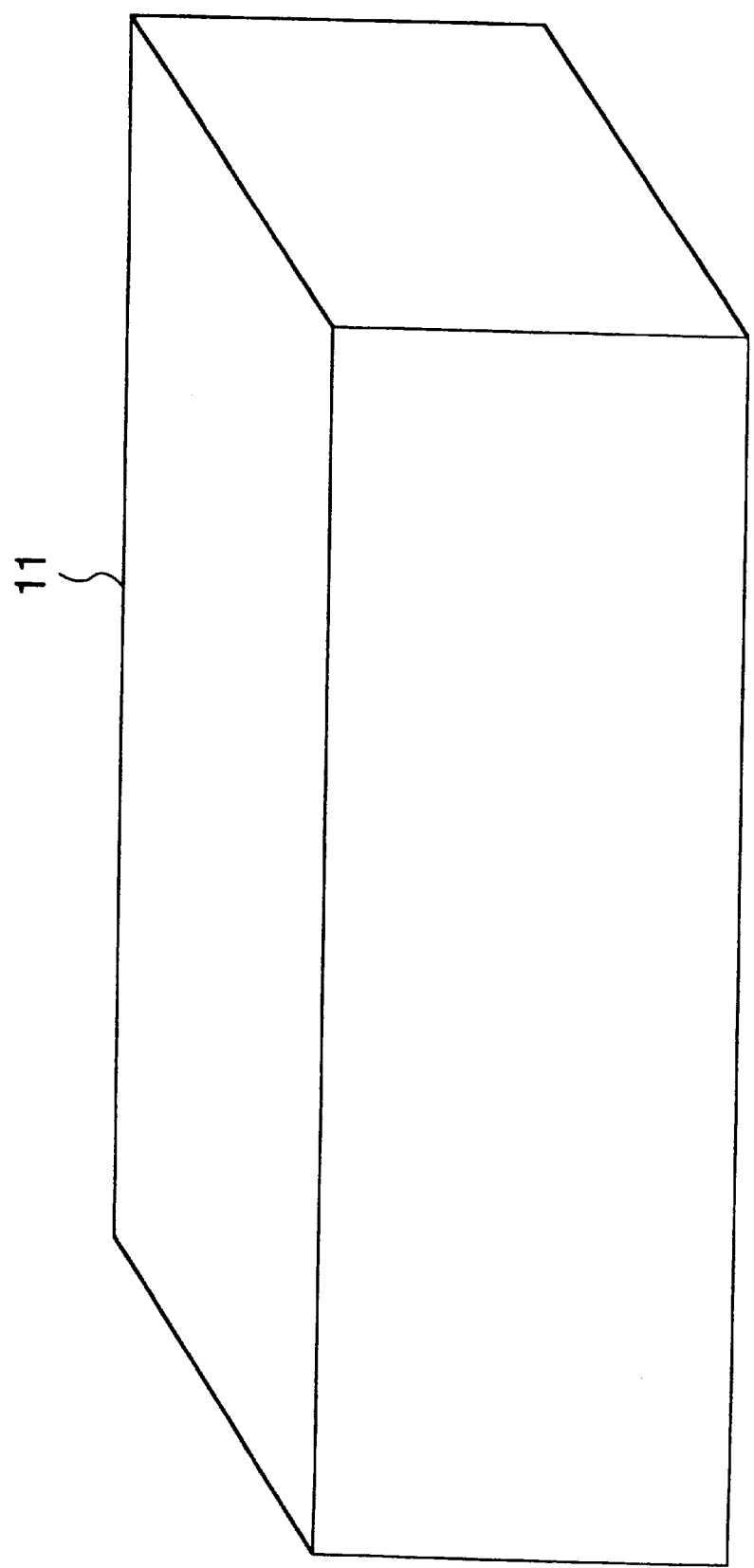
FIG. 6 is a schematic diagram illustrating a substrate sheet to be machined by a method according to an embodiment of the present invention.

FIGS. 4 and 5 illustrate the mask according to the present embodiment of the invention. As shown in FIG. 4, the mask 8 has a pattern formed on a substrate 28a wherein the pattern includes: an ink supplying part pattern 8b corresponding to the ink supplying part 2 of the nozzle 1; an ink channel pattern 8c corresponding to the ink channel 4; and an orifice part pattern 8d corresponding to the orifice part 3. These patterns 8b, 8c, and 8d are formed in the shape of composite slits. The substrate 8a is preferably made up of quartz glass capable of transmitting nearly 100% of laser beam with substantially no loss. When a large-sized pressure chamber 3a is desired, a ring-shaped slit pattern 8e may be formed in the orifice pattern as shown in FIG. 5.

The ink supply part pattern 8b and the ink channel pattern 8c are composed of a plurality of slits which are designed such that the individual slits pass proper amounts of light depending on the locations of the slits. That is, the area of each opening 8f (white area) relative to the area of the blocking portion 28g (black area) is selected so that the light beam arriving at the substrate sheet 11 after passing through the respective openings has energy optimum to create the ink supplying part 2 and the ink channel 4 with desired depths in the substrate sheet 11. In the operation of forming the structure in the substrate sheet 11, the laser beam encounters diffraction or scattering when it passes through the openings 8f, and thus the laser beam has been spread slightly when it arrives at the substrate sheet 11. The widths of the openings 8f and the blocking parts 8f of the slit pattern layer are determined taking into account the above diffraction and scattering effects so that the obtained ink supplying part 2 and ink channel 4 have desired depths. In the conventional technique using a semitransparent film, the energy density is lost when the laser beam passes through the semitransparent film. In contrast, the laser beam of the present embodiment can pass through the openings 8f of the slit pattern without loss of energy, and thus the laser beam preserves nearly 100% of the energy density. Furthermore, if a ring-shaped slit pattern 8e is formed in the orifice pattern, it is possible to realize a pressure chamber 3a with an arbitrary desired volume.

In the mask 8 having the above-described structure, it is possible to control the amount of light passing through the mask 8 after being emitted by the light source 6 by properly changing the slit widths across the mask 8. Therefore, it is possible to form the nozzle 1 including the ink supplying part 2, the orifice part 3, and the ink channel 4 having an arbitrary desired structure and depth by means of a single processing step of illumination of a laser beam through the single mask. Unlike the conventional technique in which the amount of light passing through a mask is controlled by adjusting the thickness of a reflective film (semitransparent film) formed on a substrate, the technique of the present invention has the advantage that it is possible to easily control the amount of light simply by adjusting the widths of slits without having to adjusting the thickness of the slit pattern layer. This makes it easy to produce a mask. Furthermore, unlike the conventional technique, even if the thickness of the mask 8 is reduced by the illumination of the laser beam 7, substantially no change occurs in the structure of the produced nozzle 1 as long as the slit pattern layer maintains the ability of reflecting nearly 100% of light or unless the transparency of the mask 8 drops down to a level (for example 60% or lower) which can no longer transmit the laser light with a sufficient energy to form the nozzle 1. This allows the mask 8 to be used for a longer time. The process of machining the substrate sheet 11 will be described below with reference to the figures.

After passing through the mask 8 having the above-described pattern, the laser beam 7 enters the focusing optical system 10 via the mirror 9. The focusing optical system 10 focuses the laser beam 7 into a predetermined beam size and forms an image on the substrate sheet 11.

Figure 7:
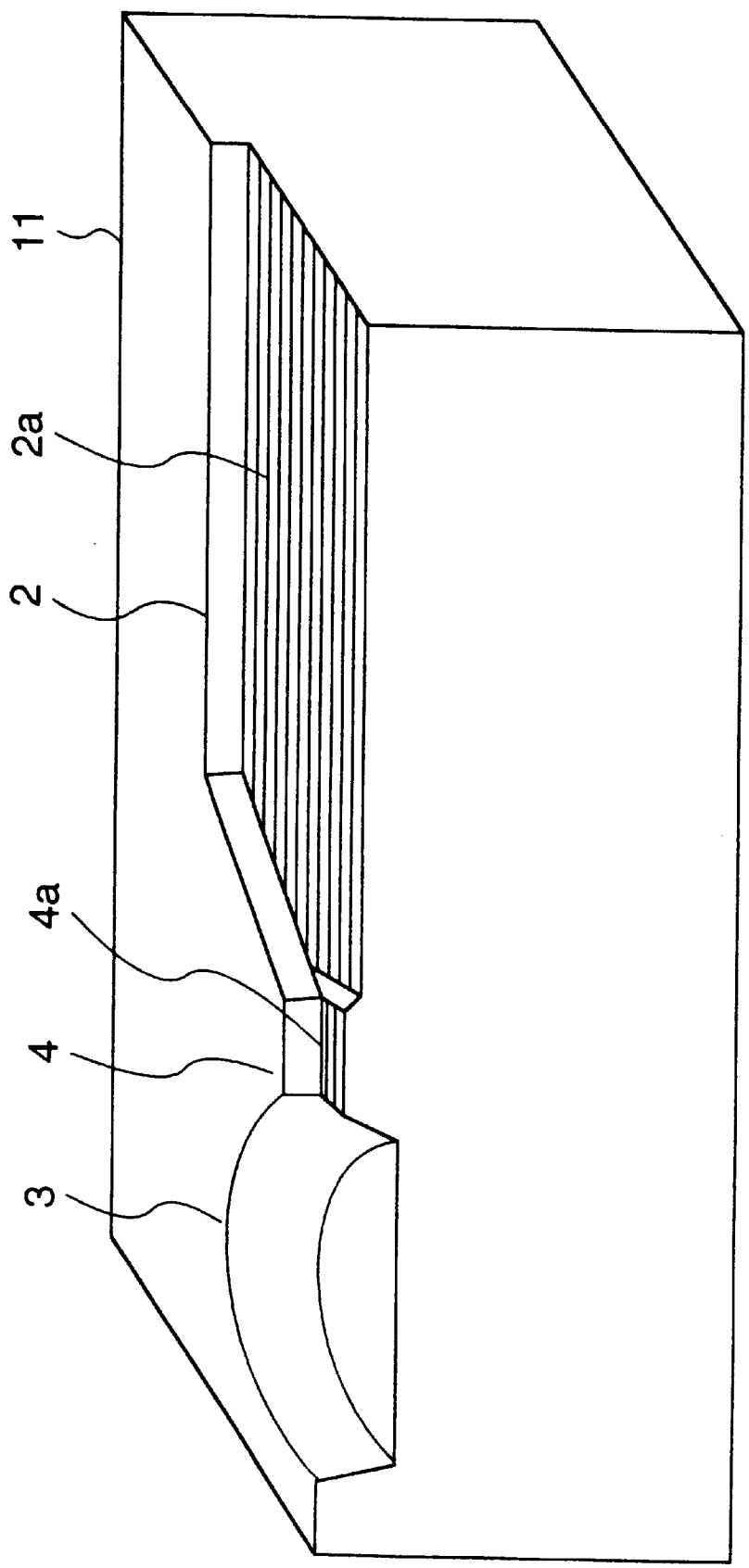
FIG. 7 is a schematic diagram illustrating a substrate sheet machined by a method according to an embodiment of the present invention.
Figure 8:
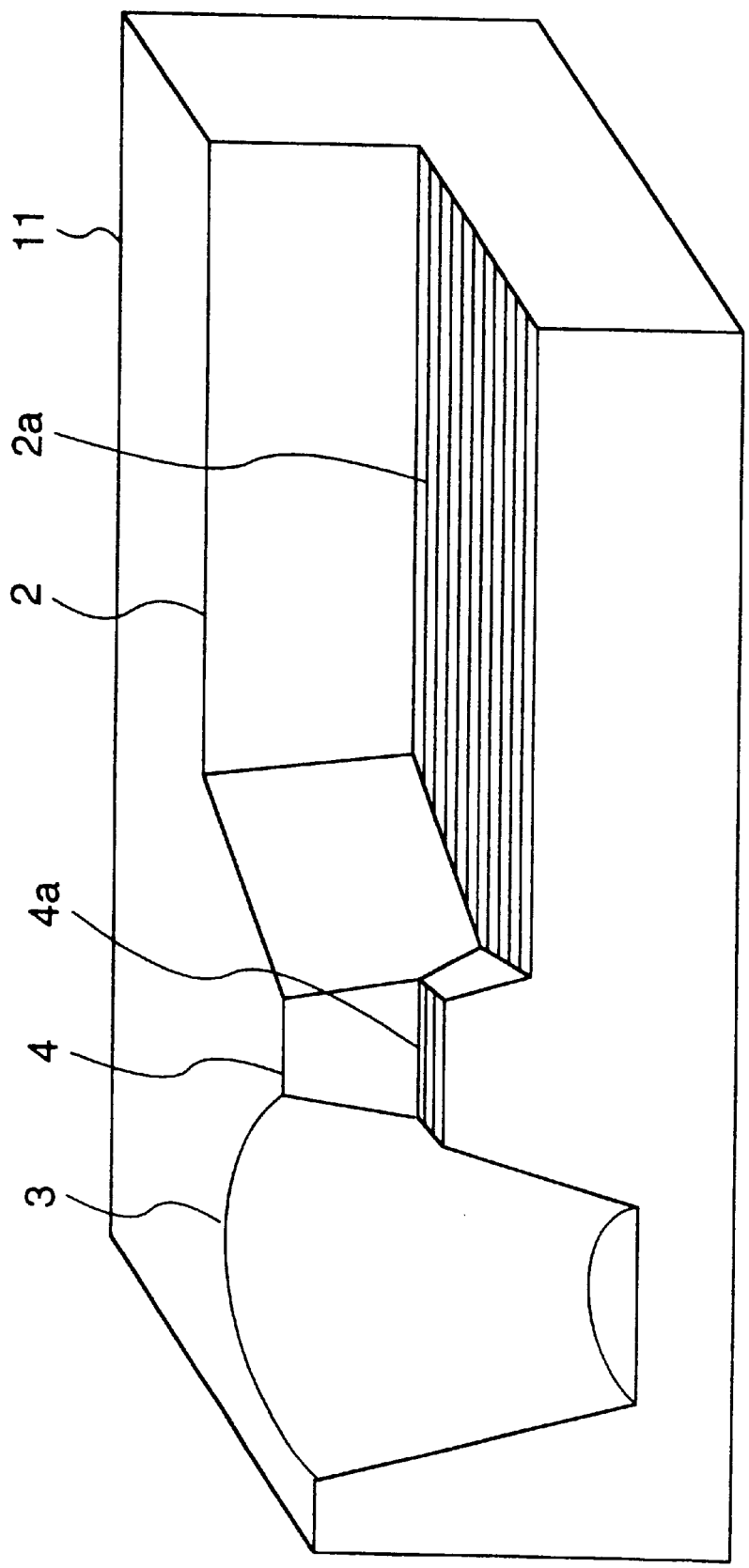
FIG. 8 is a schematic diagram illustrating a substrate sheet machined by a method according to another embodiment of the present invention.
Figure 9:
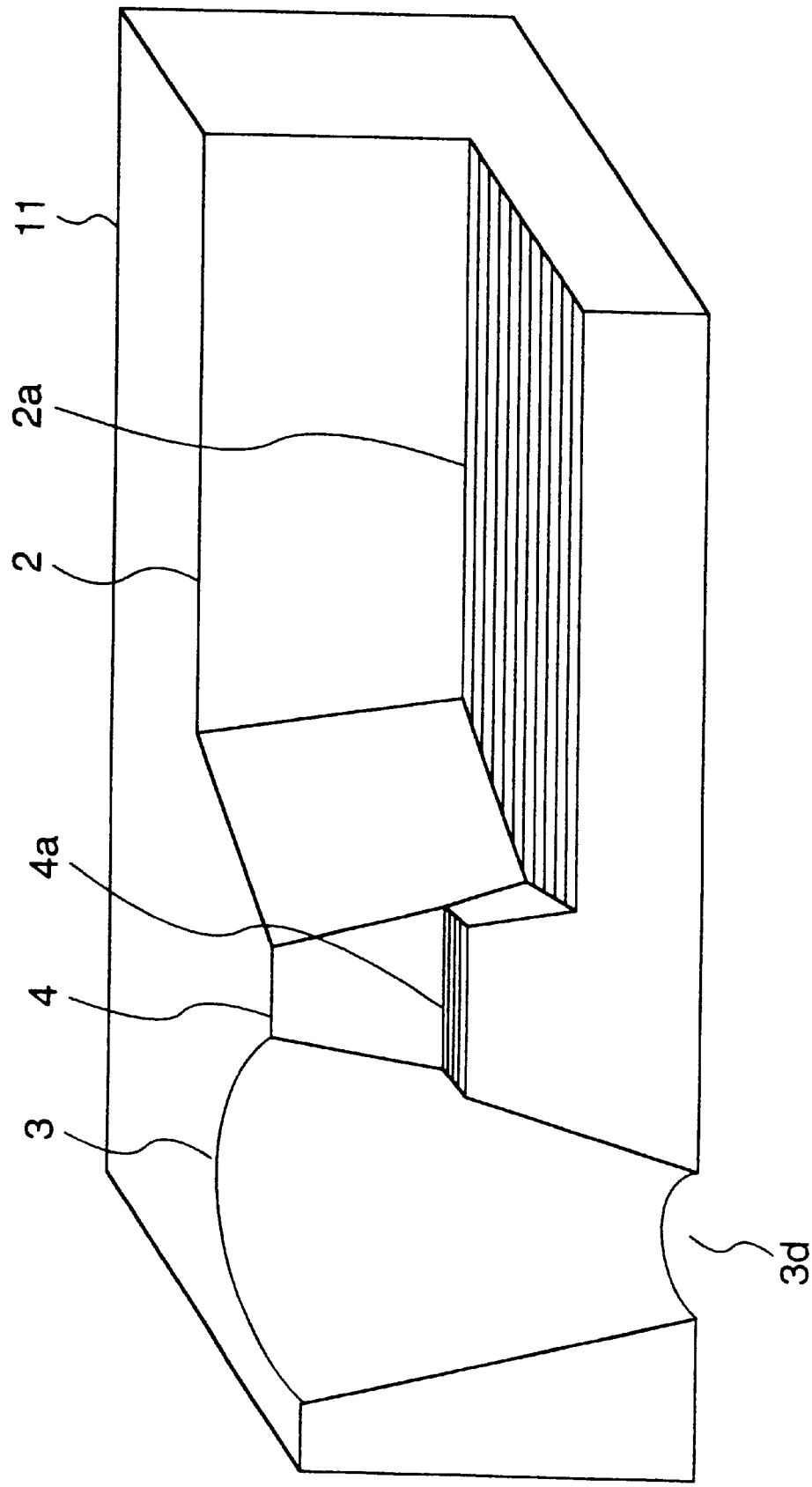
FIG. 9 is a schematic diagram illustrating a substrate sheet machined by a method according to another embodiment of the present invention.

FIGS. 6 to 9 illustrate the processing steps of machining the substrate 11 according to the present embodiment of the invention. The substrate sheet 11 serves as an upper substrate 1a of the nozzle. The substrate sheet 11 is preferable made of a macromolecular material such as polyimide, polyether sulfone. In this specific embodiment, polyimide is employed as the material for the substrate sheet 11. Before the substrate sheet 11 of polyimide is subjected to the illumination of the laser beam 7, it has the shape of a rectangular plate with parallel surfaces. If the illumination of the laser beam 7 is started, the substrate sheet 11 changes in shape depending on the amount of the laser beam striking the substrate sheet 11. In this embodiment, the laser beam 7 has an energy density distribution adjusted to form the nozzle 1. That is, the area where the orifice part 3 is to be formed receives the greatest amount of laser beam so that a through-hole is formed in that area of the substrate sheet 11. The area where the ink supplying part 2 is to be formed receives the middle amount of laser beam so that the area is machined to a middle depth. On the other hand, the area where the ink channel 4 is to be formed receives the least amount of laser beam so that the ink channel 4 has a shallow thickness. The substrate 11 is machined gradually as shown in FIGS. 7 and 8, and finally the orifice part 3 having the ink emission opening 3d extending thoroughly through the thickness of the substrate sheet 11 as well as the ink channel 4 including a plurality of fine grooves 4a are formed in the substrate sheet 11.

Figure 10:
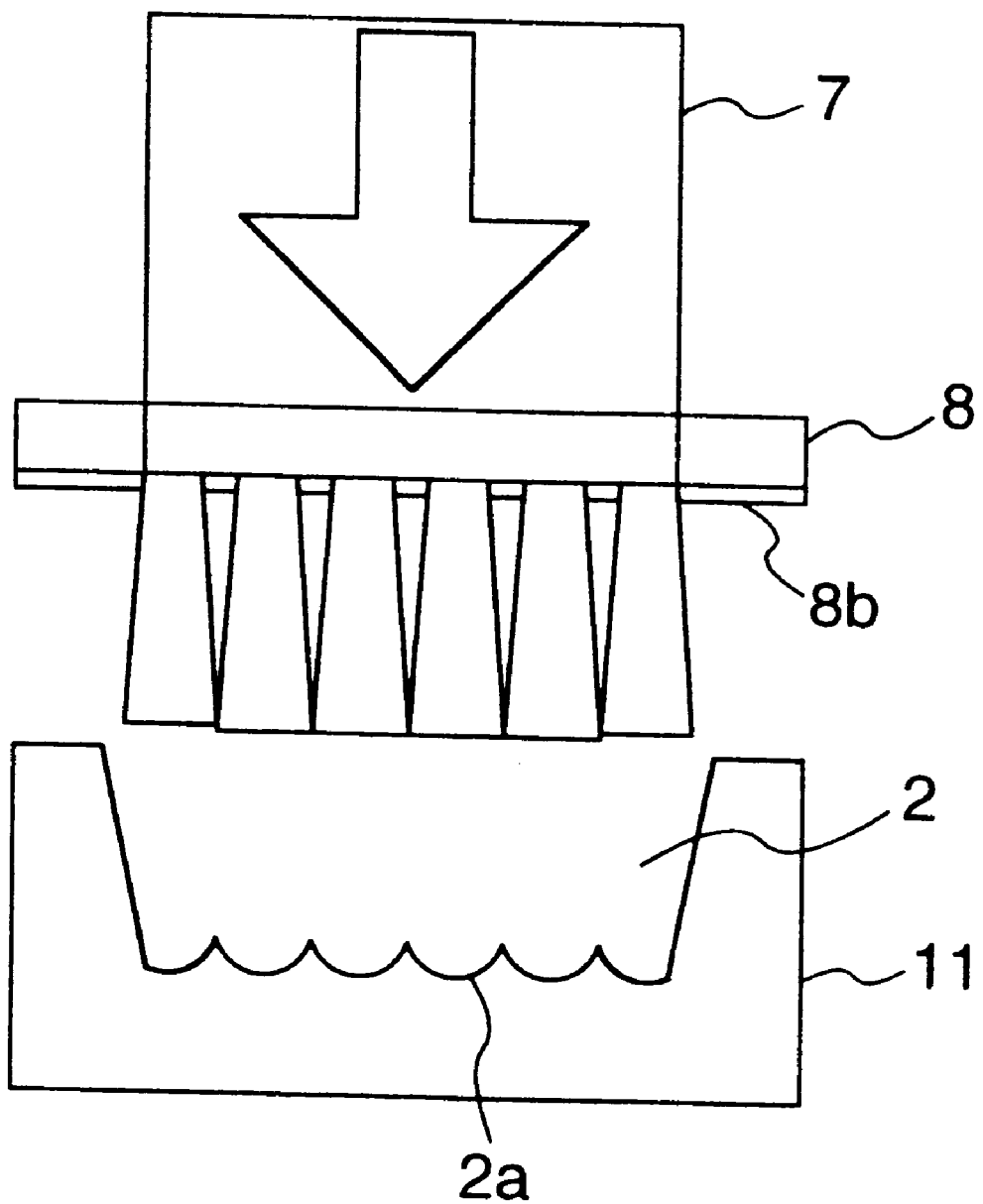
FIG. 10 is a schematic diagram illustrating the laser beam illuminating a substrate sheet according to an embodiment of the invention.

FIG. 10 illustrates the illumination of the laser beam 7 to the substrate sheet. As can be seen from FIG. 10, the fine grooves 2a and 4a can be formed very easily in the ink supply part 2 and the ink channel 4, respectively, by the illumination of the laser beam through the slits formed in the mask 8.

In the present invention, as described above, it is possible to produce an ink-jet print head nozzle having a complicated structure including an ink supplying part 2, an orifice part 3, and an ink channel 4 in one processing step using a single mask without having to exchange the mask. Furthermore, fine grooves 2a and 4a can also be formed at the same time. This means that the ink-jet print head nozzle can be produced in a reduced number of processing steps for a shorter processing time. This allows a great reduction in production cost.

Figure 11:
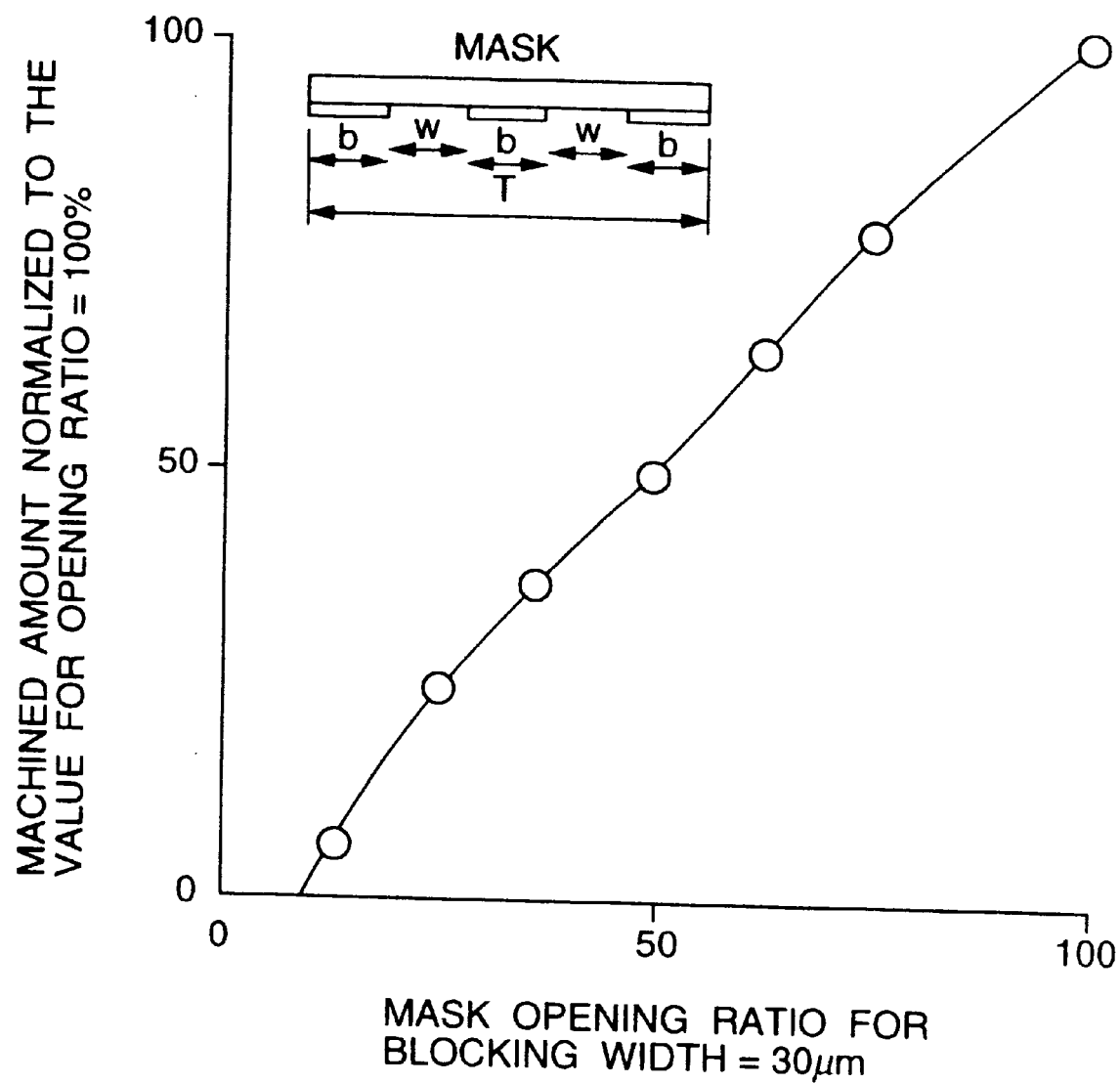
FIG. 11 is a graph illustrating the amount of machining as a function of the opening ratio of a mask according to an embodiment of the invention.

FIG. 11 is a graph illustrating the machining amount as a function of the opening ratio of the mask 8 for the case where the mask shown in FIG. 4 having the blocking part 8g with a width of 30 μm and having the opening 8f with a width in the range from 5 μm to 100 μm is employed as the mask 8. The opening ratio refers to the ratio of the area of the opening 8f to the total area of the mask. As can be seen from FIG. 11, the machined amount increases linearly with the opening ratio except the extremely low range of the opening ratio.

Furthermore, the relationship between the machined amount and the slit width of the pattern formed on the mask 8 was investigated experimentally. A plurality of masks 8 having openings with a slit width of 30 μm and having blocking parts with various slit widths ranging from 1 μm to 60 μm were prepared. Using these masks, separate substrate sheets 11 of polyimide were machined to a depth of 50 μm. The heights of the grooves formed on the respective substrate sheets were evaluated.

Figure 12:
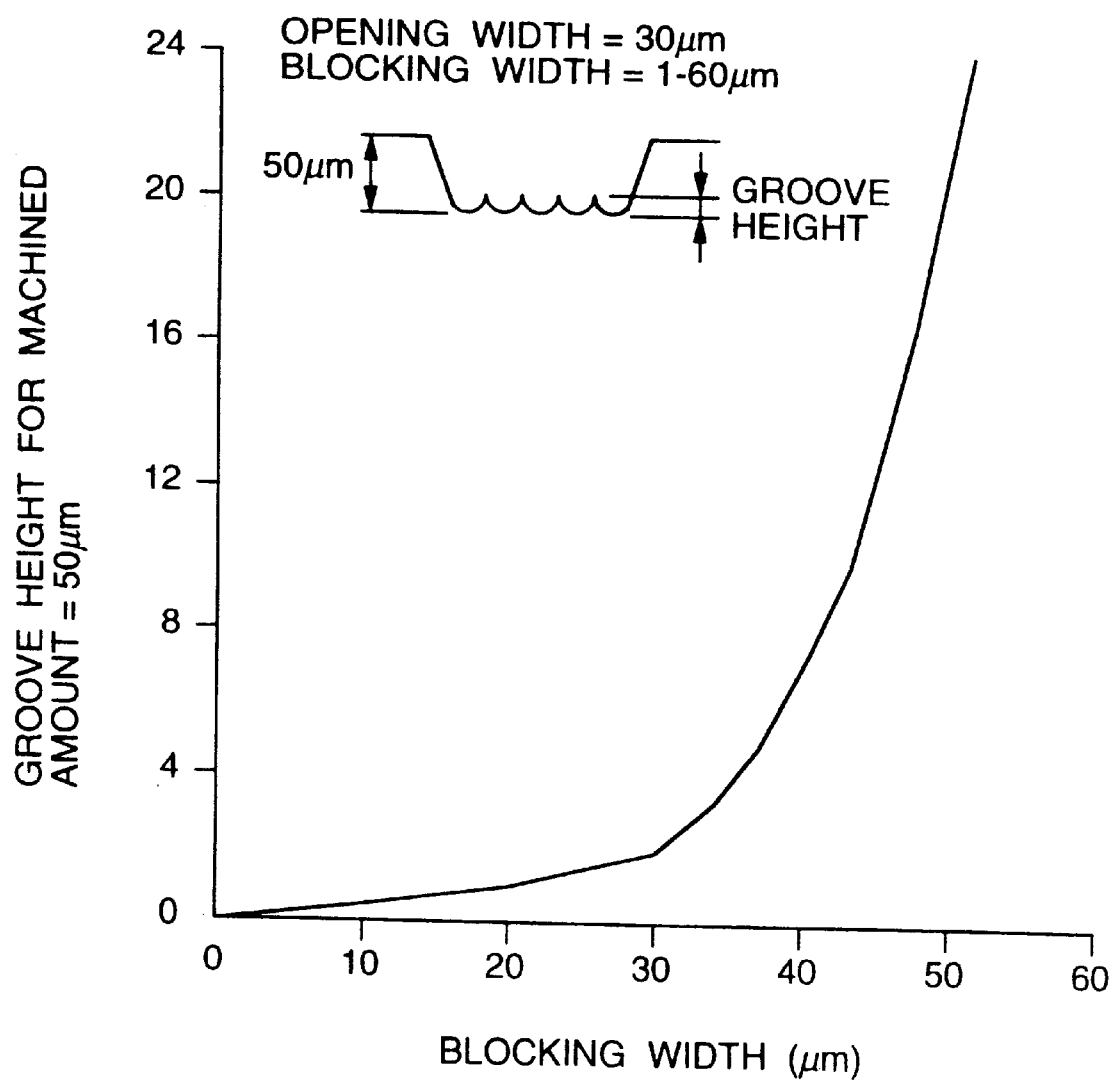
FIG. 12 is a graph illustrating the groove height as a function of the width of a blocking part according to an embodiment of the invention.

FIG. 12 illustrate the height of the groove obtained in the above experiment as a function of the width of the blocking part. As can be seen, the height of the groove changes abruptly at the width of 30 μm of the blocking part 8g of the mask 8. When the width of the blocking part 8g is smaller than 30 μm, the groove height increases slowly with the width of the blocking part 8g. However, the groove height increases abruptly when the width of the blocking part 8g exceeds 30 μm. Thus, in the present embodiment, it is preferable that the width of the blocking part 8g of the mask 8 be less than 30 μm. As described above, the nozzle needs fine grooves to obtain a stable flow of ink having a desired velocity without disturbance such as pulsation or turbulence. For this purpose, it is preferable that the groove height be in the range from 0.1 μm to 1.0 μm. Therefore, it is more desirable that the width of the blocking part 8g of the mask 8 in the range from 5 μm to 20 μm.

Figure 13:
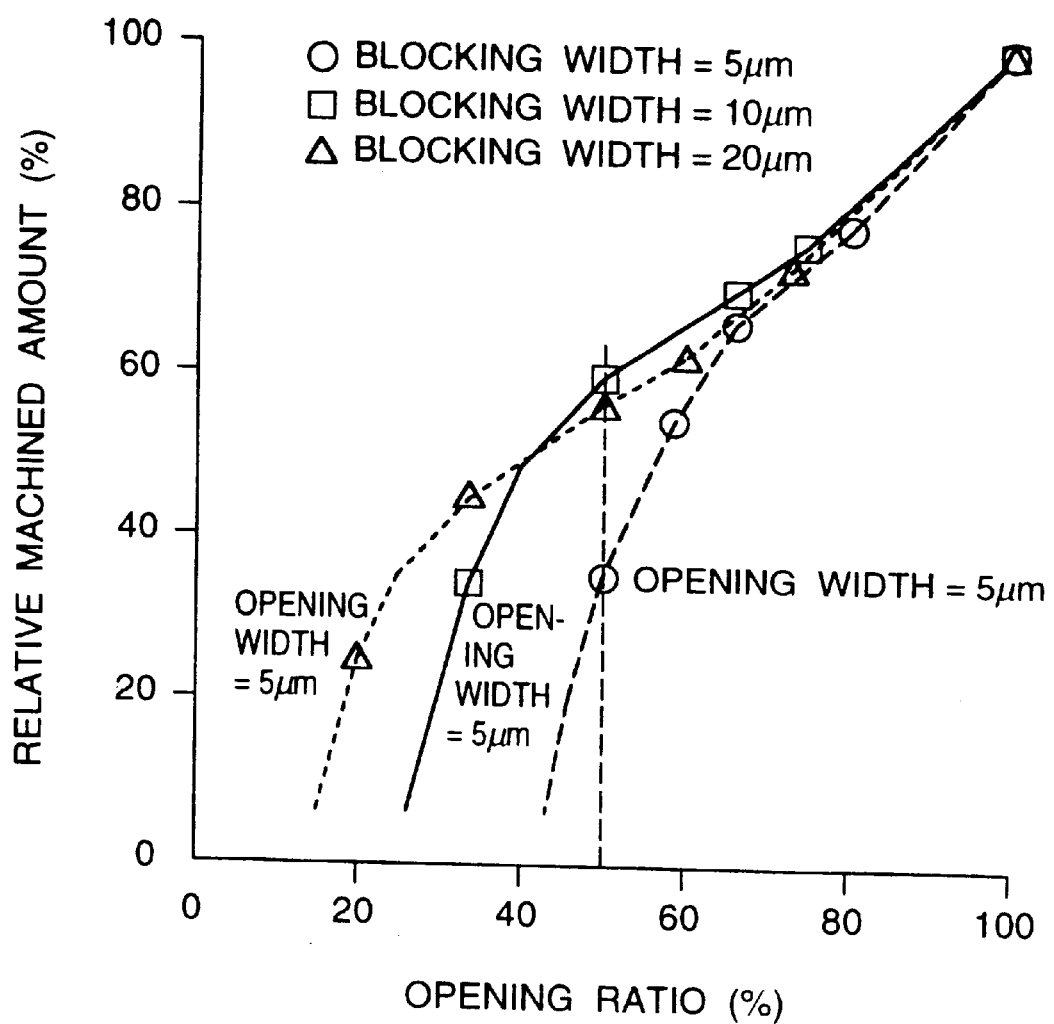
FIG. 13 is a graph illustrating the amount of machining as a function of the width of an opening according to an embodiment of the invention.

A plurality of masks 8 having blocking parts with three different slit widths, 5, 10, 20 μm, and having openings with slit widths ranging from 1 μm to 60 μm were prepared. Substrate sheets 11 were machined using these masks, the machined depth was evaluated. FIG. 13 illustrates the machined amount as a function of the opening ratio. As can be seen from FIG. 13, the linear range of the machined amount becomes very narrow if the width of the opening 8f is equal to or less than 5 μm. Such the range is undesirable in practical production process. The above undesirable reduction in the machined amount is probably due to the loss of the energy of the laser beam. Thus, it is preferable that the width of the opening 8f be greater than 5 μm. On the other hand, if the width of the opening 8f exceeds 50 μm, the machined amount becomes equal to that which is obtained when there is no slits. In this case, the slits no longer have any effects. Thus, it is required that the width of the opening 8f should be less than 50 μm. More preferably, the width of the opening 8f should be less than 30 μm to control the groove height with high enough accuracy. Therefore, it is more preferable that the width of the opening 8f be within the range from 5 μm to 30 μm.

Figure 14:
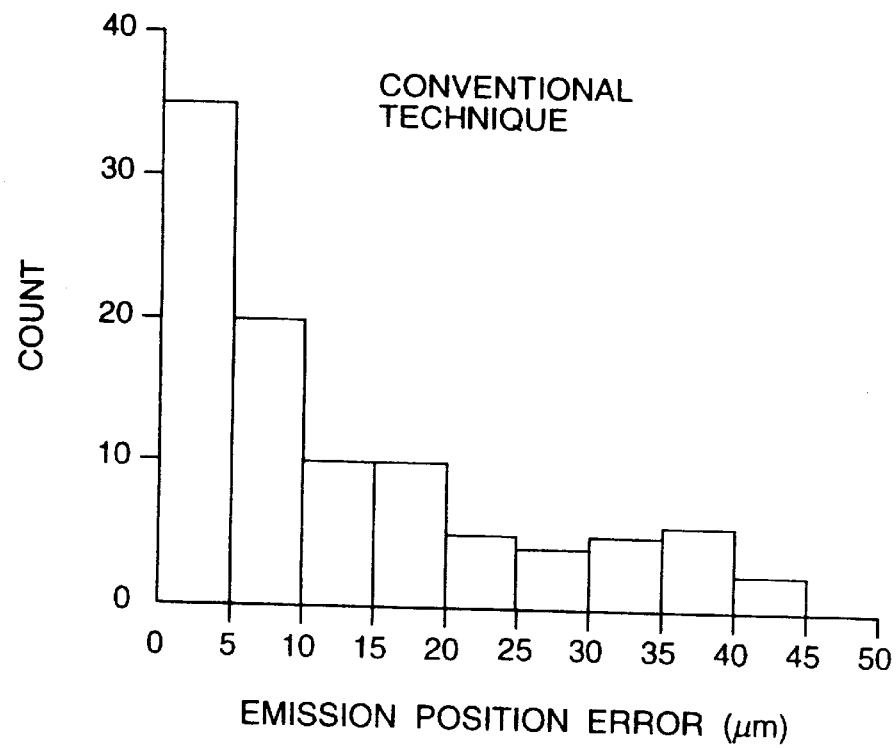
FIG. 14 is a frequency distribution chart in terms of emission position errors which occur when a conventional mask is employed.
Figure 15:
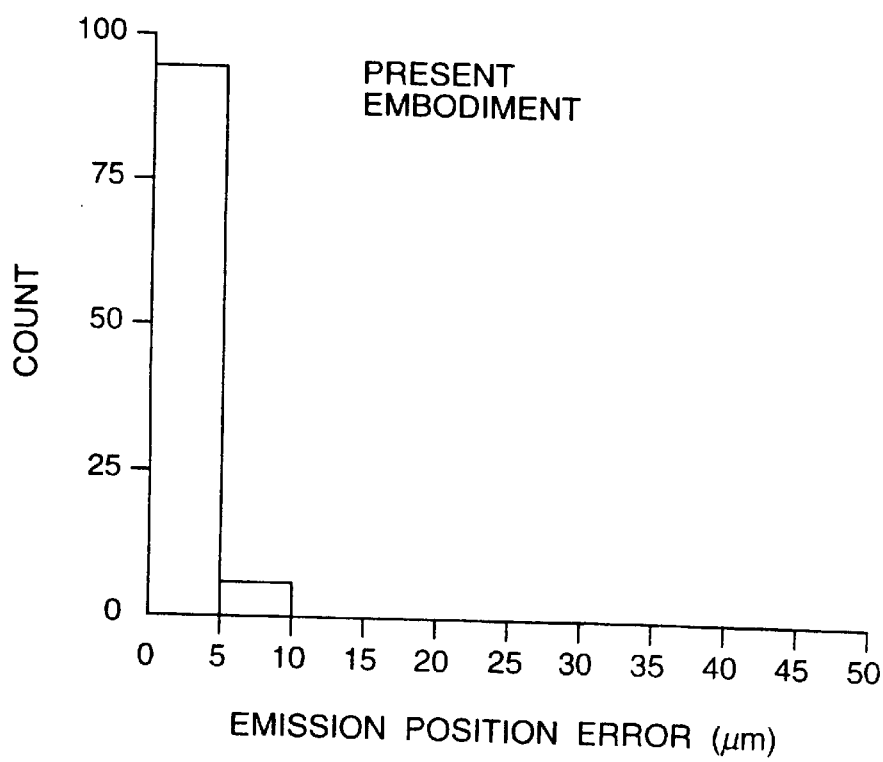
FIG. 15 is a frequency distribution chart in terms of emission position errors which occur when a mask according to an embodiment of the invention is employed.

FIGS. 14 and 15 illustrate the frequency distribution in terms of emission position errors for both cases where conventional masks are employed (FIG. 14) and the mask according to the embodiment of the invention is employed (FIG. 15). FIG. 14 illustrates the result for the case where an nozzle was produced using by means of laser beam machining with separate three masks, an orifice mask, an ink channel mask, and an ink supplying part mask in the processing steps of forming an orifice, an ink channel, and an ink supplying part, respectively. FIG. 15 illustrate the result in terms of frequency distribution obtained when the mask of the invention was employed. That is, an ink-jet print head having ink-jet nozzles was produced according to the invention it was mounted on an ink-jet printer. Similarly an ink-jet print head having ink-jet nozzles was produced according to the conventional technique and it was mounted on another similar ink-jet printer. These two ink-jet printers were evaluated in terms of printing quality. As is apparent from FIGS. 14 and 15, it is possible to achieve a less ink emission position error if the mask 8 according to the present embodiment of the invention is employed. This is because in the case of the present invention it is possible to form the complicated structure including the orifice part 3, the ink supplying part 2, and the ink channel 4 having depths different from each other in a single processing step using the single mask. This means that if the mask 8 is employed, substantially no ink emission position error caused by the deviation of the center of the orifice 3c relative to the center of the pressure chamber 3a occurs. Thus, it is possible to produce a nozzle 1 with a high precision. The obtained nozzle 1 can control the amount of ink with high accuracy required. The nozzle 1 can be used to produce an ink-jet printing apparatus capable of providing very high printing quality. Furthermore, it is possible to easily produce such the nozzle 1 for a short processing time.

As described above, the present embodiment of the invention can provide a high-performance ink-jet printer having an ink-jet print head with ink-jet nozzles in which fine grooves 4a and 2a are formed on the bottom of the ink channel 4 and also on the bottom of the ink supplying part 2 such that the grooves extend in parallel to the ink supply direction. The ink-jet printer can form extremely high quality characters or images with a very small ink emission position error.

Figure 16A:
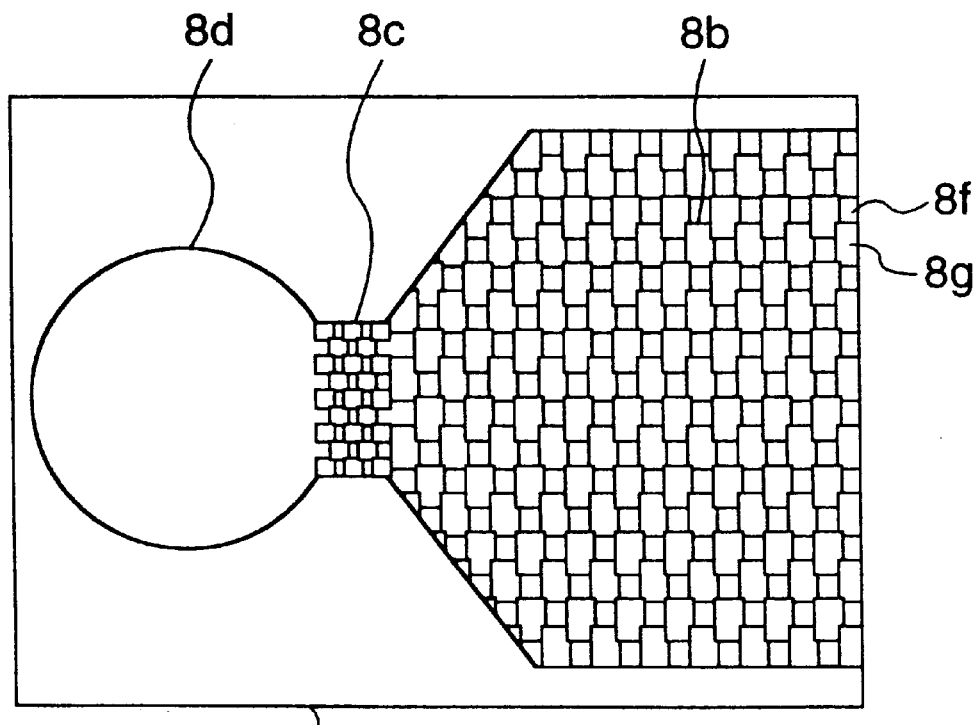
FIG. 16 is a schematic diagram of a mask according to an embodiment of the invention.
Figure 16B:
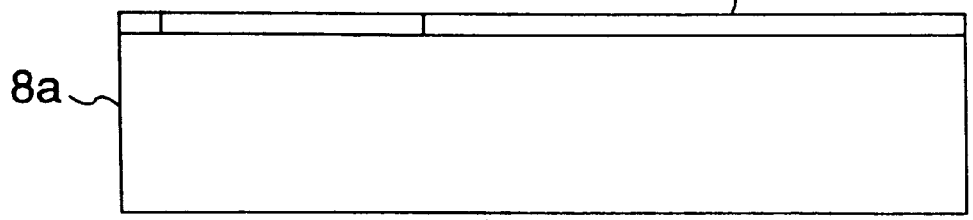
Figure 17A:
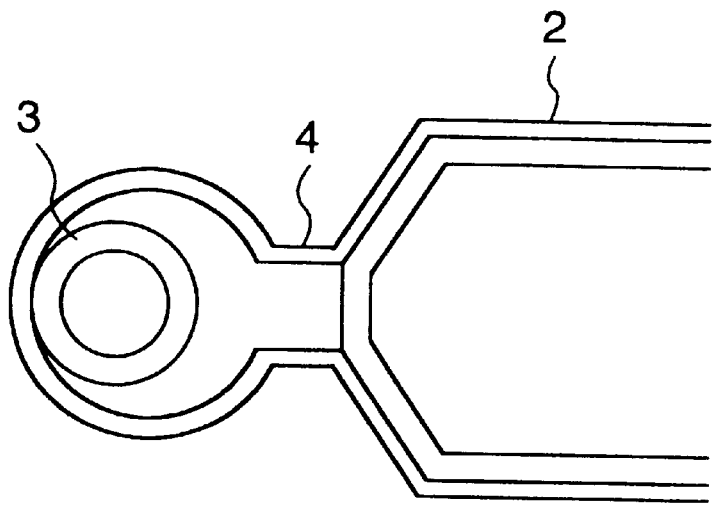
FIGS. 17A–C are schematic diagrams illustrating some examples of machining errors in terms of position which occur when a conventional mask is employed.
Figure 17B:
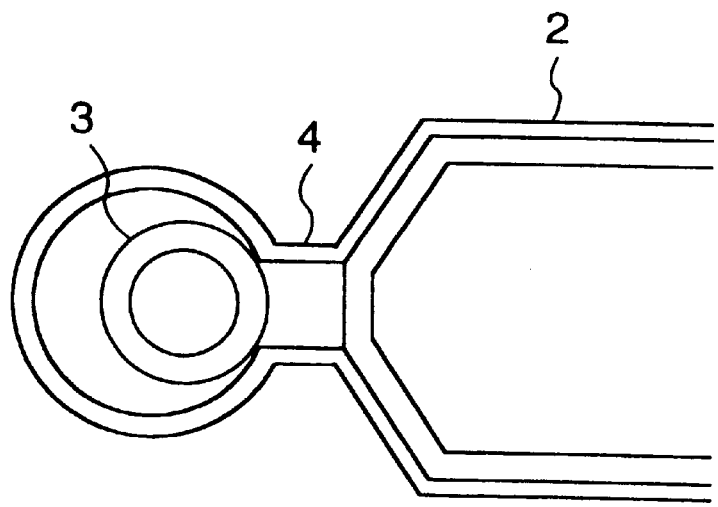
Figure 17C:
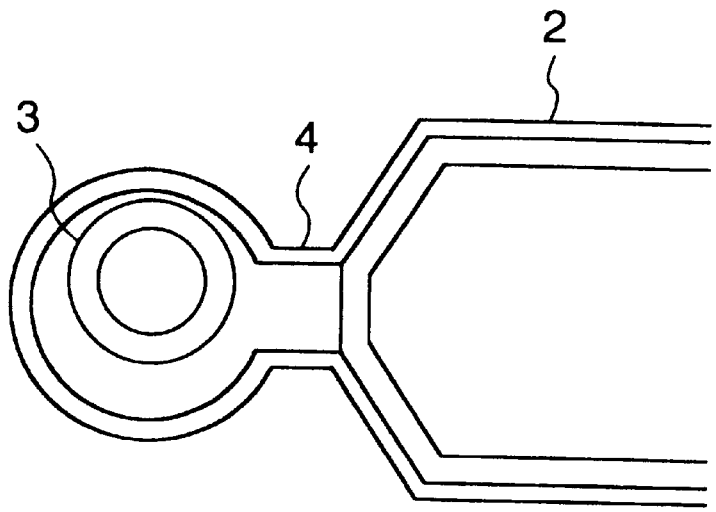

Although in the above embodiment the mask pattern is formed in the shape of slits, the mask pattern may also be formed in the shape of mosaic of openings and blocking parts. FIG. 16 illustrates an example of a mask having a mosaic pattern according to the present embodiment of the invention. It will be understood that the mask having such the mosaic pattern of openings and blocking parts with proper opening ratios may also be used for the same purpose as the mask having the slit pattern described above.

As described above, the present embodiment of the invention provides the laser beam machining apparatus for producing a nozzle including an orifice part 3, an ink channel 4, and an ink supplying part by means of illumination of a laser beam through a mask having a slit pattern, wherein the apparatus is adapted to form the nozzle by illuminating a substrate sheet 11 with the laser beam through the mask having the composite slit pattern thereby forming the orifice part 3, the ink channel 4, and the ink supplying part 2 on the substrate sheet 11 in such a manner that the orifice part 3, the ink channel 4, and the ink supplying part 2 are all formed at the same time.

Embodiment 3

In this third embodiment of the present invention, a hologram is produced by means of the laser beam machining.

An ideal hologram is composed of successive inclined planes like saw teeth. This structure is most desirable to achieve a high diffraction efficiency. However, it is very difficult to realize such the structure. Therefore, in practice, a hologram pattern is usually formed into the shape of steps in cross section by means of a plurality of etching processes. This needs a large number of processing steps and a long processing time.

Figure 19A:
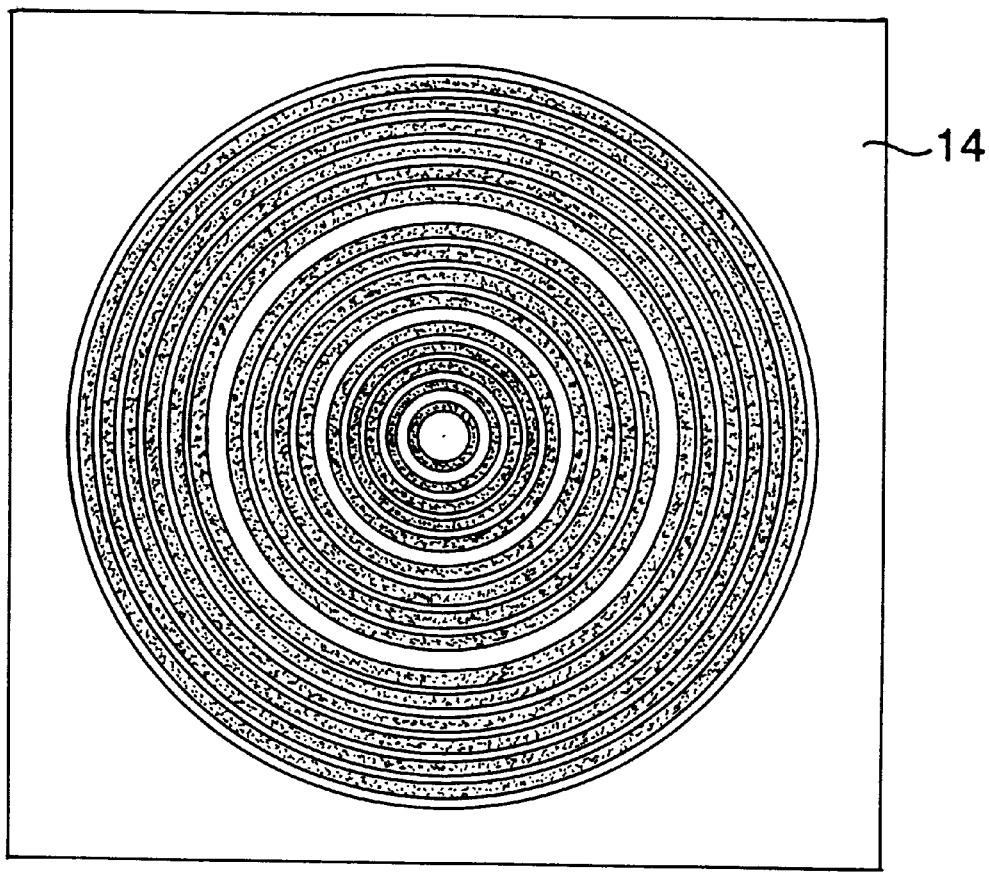
FIG. 19 is a schematic diagram showing a front view as well as a cross-sectional view of a mask according to an embodiment of the invention.
Figure 19B:
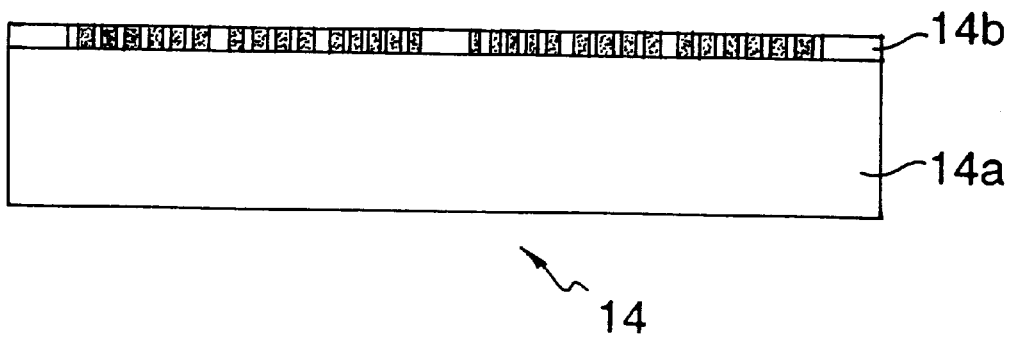
Figure 21:
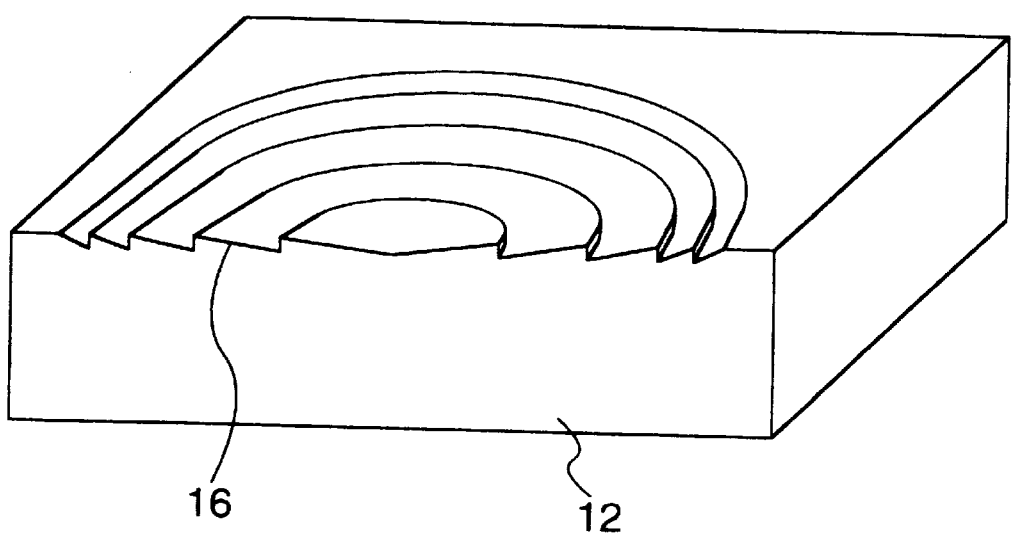
FIG. 21 is a schematic diagram illustrating an optical glass substrate on which a hologram is formed according to an embodiment of the invention.

A front view and a cross-sectional view of a mask according to the present embodiment of the invention are shown in FIG. 19. In FIG. 19, the mask 14 used to produce a hologram includes a substrate 14a and hologram slits 14b formed on the substrate 14a. The structure of the hologram slits 14b is determined in accordance with the structure of a hologram to be produced. In this specific embodiment, the hologram slits 14b are formed into the shape of concentric circles so as to produce a circular shaped hologram. In FIG. 19, the white areas denote openings, and the black areas denote blocking parts. The hologram mask 14 having the above structure is placed at the location denoted by reference numeral 28 in FIG. 22. Furthermore, an optical glass substrate 21 on which the hologram is to be formed is placed at a location denoted by reference numeral 31. The optical glass substrate 12 is illuminated with light emitted by a light source 26 via the mask 14. When the light beam 27 passes through the mask 40, the light beam 27 has an energy distribution corresponding to the spacing of the slits. By illumination of the light beam 27 having such the energy distribution, a corresponding hologram pattern composed of grooves with a desired depth are formed on the optical glass substrate 12. FIG. 21 is a perspective view illustrating the optical glass substrate 12 on which the hologram pattern is formed in the above described manner according to the present embodiment of the invention. As shown in FIG. 21, it is possible to form a very sharp hologram pattern with inclined planes having a structure of saw teeth in cross section on the surface of the optical glass substrate 12 using the hologram mask 14. Thus, the technique according to the present embodiment of the invention makes it possible to produce a hologram having an ideal saw-tooth shape, which cannot be produced by the conventional technique, for a short time without significant difficulty.

Embodiment 4

A more preferable method of forming a hologram will be described below.

Figure 18:
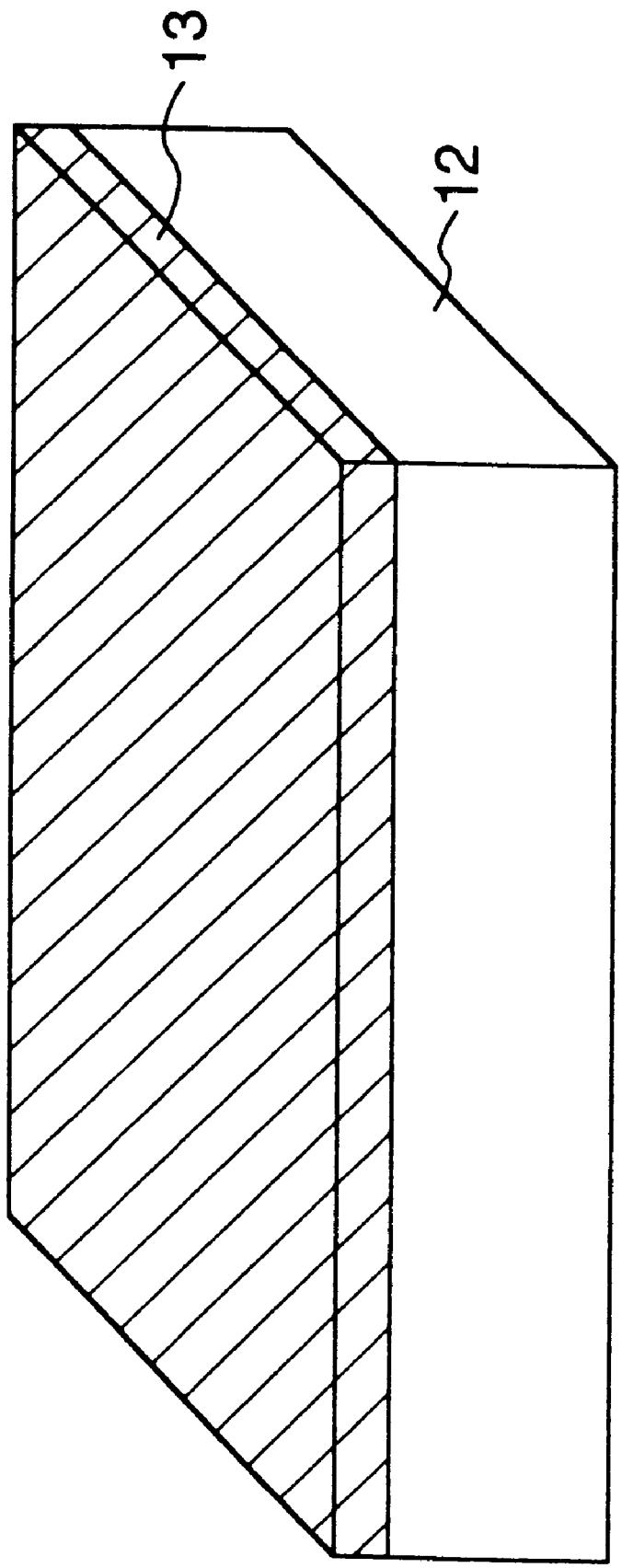
FIG. 18 is a perspective view of an object to be machined according to an embodiment of the present invention.

FIG. 18 is a perspective view of an object to be machined according to the present embodiment of the invention. In FIG. 18, reference numeral 12 denotes an optical glass member on which a hologram is to be formed. The optical glass member 12 has a thin film 13 formed thereon. The thin film 13 is preferably made of an organic resin film. The organic resin film is particularly desirable in that a high-precision hologram pattern is formed in the thin film for a short processing time. In this specific example, the thin film 13 is formed by coating a 2–4 $\mu$m resist film of a novolac resin or a quinonediazide compound on the optical glass substrate 12 and then curing it at 160° C. to 180° C. Alternatively, the thin film 13 may also be formed using other organic resins such as polyimide.

Figure 20:
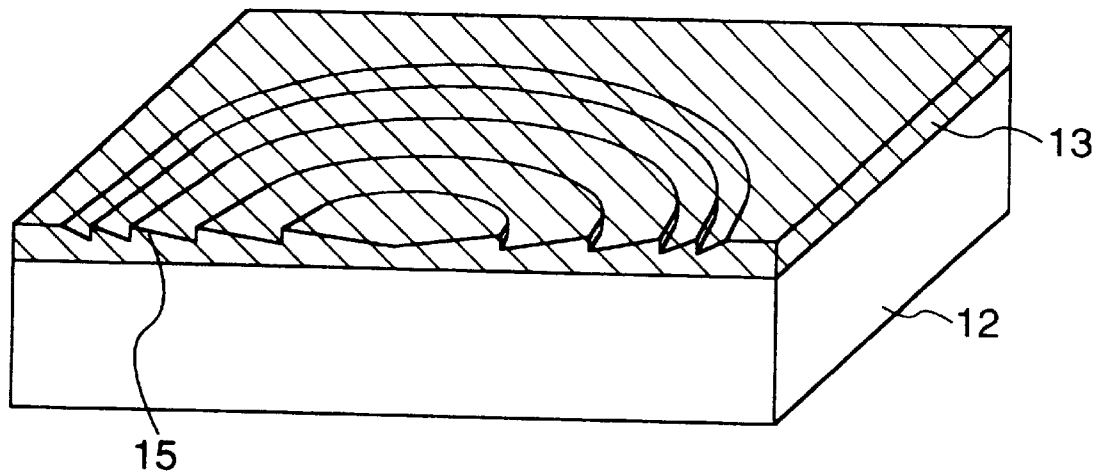
FIG. 20 is a schematic diagram illustrating a hologram pattern formed in a thin film according to an embodiment of the invention.

As in the third embodiment described above, a hologram pattern is formed by means of the laser beam machining technique using the hologram mask 14. FIG. 20 illustrates the hologram pattern formed in the thin film. In this embodiment, the hologram pattern is formed first in the thin film 13 by means of the illumination of the laser beam via the hologram mask 14. When the formation of the hologram pattern 15 in the thin film 13 is completed, the illumination of the laser beam is stopped. Then, the optical glass substrate 12 is etched by means of ion milling using the thin film 13 as an etching mask. If the ion milling is performed until the thin film 13 is absolutely removed, then the hologram pattern 16 is transferred onto the optical glass substrate 12 as shown in FIG. 21.

This technique of forming the hologram pattern 15 needs a lower laser energy than required when the hologram pattern is formed directly on the glass substrate by illuminating the substrate with a laser beam. This makes it possible to select the opening ratio of the mask with a greater degree of freedom. Thus, the flexibility of mask design is improved. Furthermore, the hologram can be formed with an improved accuracy for a shorter processing time.

Although in the above specific example, the ion milling is employed to transfer the hologram pattern 15 formed in the thin film 13 onto the optical glass substrate 12, other techniques such as wet etching, dry etching, and sputtering may also be employed. This technique allows the hologram pattern 16 to be formed on the optical glass member in a high efficient manner.

As described above, the present invention provides the laser beam machining method including the steps of: emitting a light beam from a light source so that the light beam illuminates a mask having an opening portion through which the light beam can pass and a blocking portion through which the light beam cannot pass; and illuminating an object to be machined with the light passing through the opening portion of the mask thereby supplying working light to the object, whereby the object is machined by the energy of the working light. This makes it possible to form a complicated structure in the object only by a single processing step of illuminating the object with the light beam via the single mask. Another advantage is that the object can be machined with extremely high accuracy using a mask which can be produced easily. Thus, the present invention provides an excellent method of producing a high-precision component. Furthermore, the method of the invention allows a reduction in production cost.

Furthermore, the width of the blocking part of the slit pattern of the mask is preferably less than 30 $\mu$m so that the machining accuracy is further improved. This makes it possible to produce a high-precision component with an extremely high accuracy for a short time.

Still furthermore, the width of the opening of the slit pattern of the mask is preferably less than 50 $\mu$m so that the machining accuracy is further improved. This makes it possible to produce a high-precision component with an extremely high accuracy for a short time.

Furthermore, the slit pattern of the mask is formed using either a metal material containing at least one of Cr, Ag, Ti, Pt, or Ni, or a dielectric material. This minimizes the loss of the slit pattern layer caused by the illumination of the light beam and thus maximizes the durability of the mask.

Advantageously, the present invention may also be employed to produce an ink-jet print head. It is possible to form fine grooves in the ink supplying part and the ink channel at the same time as other portions. In this production technique, substantially no positioning or alignment error occurs between the fine grooves in the ink supplying part and the ink channel relative to other portions. This makes it possible to obtain a stable flow of ink with a constant velocity. This leads to an improvement in printing quality.

What is claimed is:

1. A laser beam machining method comprising the steps of:

emitting light from a light source so that said light illuminates a mask comprising openings through which light can pass and blocking parts through which substantially no light can pass;

illuminating an object to be machined with light passing through said openings of the mask thereby supplying working light to said object;

forming an energy distribution corresponding to a machining configuration on said object by interfering said light which is diffracted at said openings, wherein each of said openings has a width of from 5 $\mu$m to 30 $\mu$m, and each of said blocking parts has a width which is less than or equal to 30 $\mu$m; and machining said object by the energy of said working light by means of ablation.

2. A laser beam machining method according to claim 1, wherein the shape of the openings and the shape of the blocking parts of said mask are adjusted in accordance with a desired shape into which said object is to be formed so that the working light passing through said mask has an energy distribution to form said object into the desired shape.

3. A laser beam machining method according to claim 2, wherein said shape is a slit.

4. A laser beam machining method according to claim 3, wherein the slit of the mask is formed of a dielectric material.

5. A laser beam machining method according to claim 1, wherein the width of a blocking part of said mask is adjusted relative to the width of an opening of said mask so that the working light passing through said mask has an energy distribution to form said object into the desired shape.

6. A laser beam machining method according to claim 1, wherein said mask is formed of a metal material including at least one of Cr, Ag, Ti, Pt, or Ni.

7. A laser beam machining method according to claim 1, wherein said blocking part has a thickness of from 800 Å to 2500 Å.

8. A laser beam machining method according to claim 1, wherein a distance L1 between the mask and the object to be machined is within the range of from 0.3 m to 2.0 m.

9. A laser beam machining method according to claim 1, wherein said mask comprises a first area having a pattern of openings and blocking parts and a second area having a pattern of openings and blocking parts, and wherein the pattern of said first area is different from the pattern of said second area.

* * * * *